United States Patent
Kaewka et al.

(10) Patent No.: US 11,962,559 B2
(45) Date of Patent: Apr. 16, 2024

(54) SYSTEM AND METHOD FOR PROVIDING SOCIAL INTERACTION INTERFACE FOR EMAILS

(71) Applicant: Verizon Media Inc., New York, NY (US)

(72) Inventors: Thanawat Kaewka, San Jose, CA (US); Lu Wang, Sunnyvale, CA (US); Muchen Liu, Toronto (CA); Gautham Krishna, Brampton (CA)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 17/571,816

(22) Filed: Jan. 10, 2022

(65) Prior Publication Data

US 2023/0224268 A1 Jul. 13, 2023

(51) Int. Cl.
*G06F 17/00* (2019.01)
*H04L 51/42* (2022.01)
*G06F 3/0482* (2013.01)
*G06F 3/0484* (2022.01)

(52) U.S. Cl.
CPC ............ *H04L 51/42* (2022.05); *G06F 3/0482* (2013.01); *G06F 3/0484* (2013.01)

(58) Field of Classification Search
CPC ....... H04L 51/42; G06F 3/0482; G06F 3/0484
See application file for complete search history.

(56) References Cited

U.S. PATENT DOCUMENTS

| | | | |
|---|---|---|---|
| 9,350,692 B1* | 5/2016 | van As | H04L 51/216 |
| 9,563,336 B2* | 2/2017 | Barak | G06F 9/451 |
| 9,614,934 B2* | 4/2017 | Levy | G06Q 10/06395 |
| 11,102,244 B1* | 8/2021 | Jakobsson | H04L 51/42 |
| 2009/0138559 A1* | 5/2009 | Jones | G06Q 10/00 709/206 |
| 2010/0070592 A1* | 3/2010 | Steuer | H04L 51/216 709/206 |
| 2011/0010182 A1* | 1/2011 | Turski | H04L 51/224 715/810 |
| 2011/0055333 A1* | 3/2011 | Guy | H04L 51/52 709/206 |
| 2013/0086699 A1* | 4/2013 | Polis | H04L 67/53 726/29 |
| 2015/0032824 A1* | 1/2015 | Kumar | H04L 67/535 709/206 |
| 2015/0156148 A1* | 6/2015 | Doulton | H04L 51/18 709/206 |
| 2015/0188870 A1* | 7/2015 | Sharp | H04L 51/42 715/752 |
| 2015/0363092 A1* | 12/2015 | Morton | G06F 3/04817 715/752 |

(Continued)

*Primary Examiner* — Mohammed H Zuberi
(74) *Attorney, Agent, or Firm* — Cooper Legal Group LLC

(57) ABSTRACT

One or more computing devices, systems, and/or methods are provided. In an example, an email addressed to an email address associated with an email account is received. A request to display the email is received from a client device associated with the email account. In response to receiving the request to display the email, the email and a social interaction interface are displayed via an email interface on the client device. The social interaction interface includes one or more social interaction features. The one or more social interaction features include a commenting feature, a feedback feature and/or a chat feature.

20 Claims, 18 Drawing Sheets

(56) References Cited

U.S. PATENT DOCUMENTS

| | | | |
|---|---|---|---|
| 2016/0057089 A1* | 2/2016 | Agrawal | H04L 51/216 |
| | | | 709/206 |
| 2016/0344758 A1* | 11/2016 | Cohen | G06F 3/04842 |
| 2017/0134329 A1* | 5/2017 | Edgar | H04L 51/226 |
| 2018/0219823 A1* | 8/2018 | Mohan | G06Q 10/107 |
| 2018/0268416 A1* | 9/2018 | Ponnusamy | H04L 51/212 |
| 2018/0367519 A1* | 12/2018 | Johansen | H04L 51/212 |
| 2019/0066230 A1* | 2/2019 | Dange | G06Q 30/0205 |
| 2021/0250318 A1* | 8/2021 | Kwon | H04L 51/226 |
| 2022/0044309 A1* | 2/2022 | Jose | G06Q 30/0621 |
| 2022/0109651 A1* | 4/2022 | Leigh | G06F 3/0481 |
| 2022/0166738 A1* | 5/2022 | Gray | G06F 3/0481 |
| 2022/0171525 A1* | 6/2022 | Suh | G06F 3/04847 |

\* cited by examiner

FIG. 7B

SYSTEM AND METHOD FOR PROVIDING SOCIAL INTERACTION INTERFACE FOR EMAILS

BACKGROUND

Many services, such as email services may allow users to create email accounts for sending and receiving emails. For example, a plurality of emails may be sent to a plurality of email accounts as part of at least one of a promotion, a newsletter, etc. However, social interaction features associated with the emails may not be provided and users may be unable to post comments and/or submit feedback associated with the emails.

SUMMARY

In accordance with the present disclosure, one or more computing devices and/or methods are provided. In an example, an email addressed to an email address associated with an email account is received. A request to display the email is received from a client device associated with the email account. In response to receiving the request to display the email, the email and a social interaction interface are displayed via an email interface on the client device. The social interaction interface comprises one or more social interaction features. The one or more social interaction features comprise a commenting feature, a feedback feature and/or a chat feature.

In an example, a request to send emails with social interaction interfaces to a plurality of recipient email accounts is received. Email content associated with the request and a plurality of email addresses associated with the plurality of recipient email accounts are received. A plurality of dynamic emails is generated. A first dynamic email of the plurality of dynamic emails is addressed to a first email address of the plurality of email addresses. The first dynamic email comprises at least a portion of the email content. The first dynamic email comprises dynamic content comprising a social interaction interface comprising one or more social interaction features, wherein the one or more social interaction features comprise a commenting feature, a feedback feature and/or a chat feature. The plurality of dynamic emails is transmitted to the plurality of recipient email accounts.

In an example, an email addressed to an email address associated with an email account is received. It is determined that the email is a social interaction-activated email. A request to display the email is received from a client device associated with the email account. Based upon the determination that the email is the social interaction-activated email, the email and a social interaction interface are displayed via an email interface on the client device. The social interaction interface comprises one or more social interaction features. The one or more social interaction features comprise a commenting feature, a feedback feature and/or a chat feature.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 7B is a component block diagram illustrating an example system for generating and/or providing emails with social interaction interfaces, where a communication system generates a first dynamic email.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
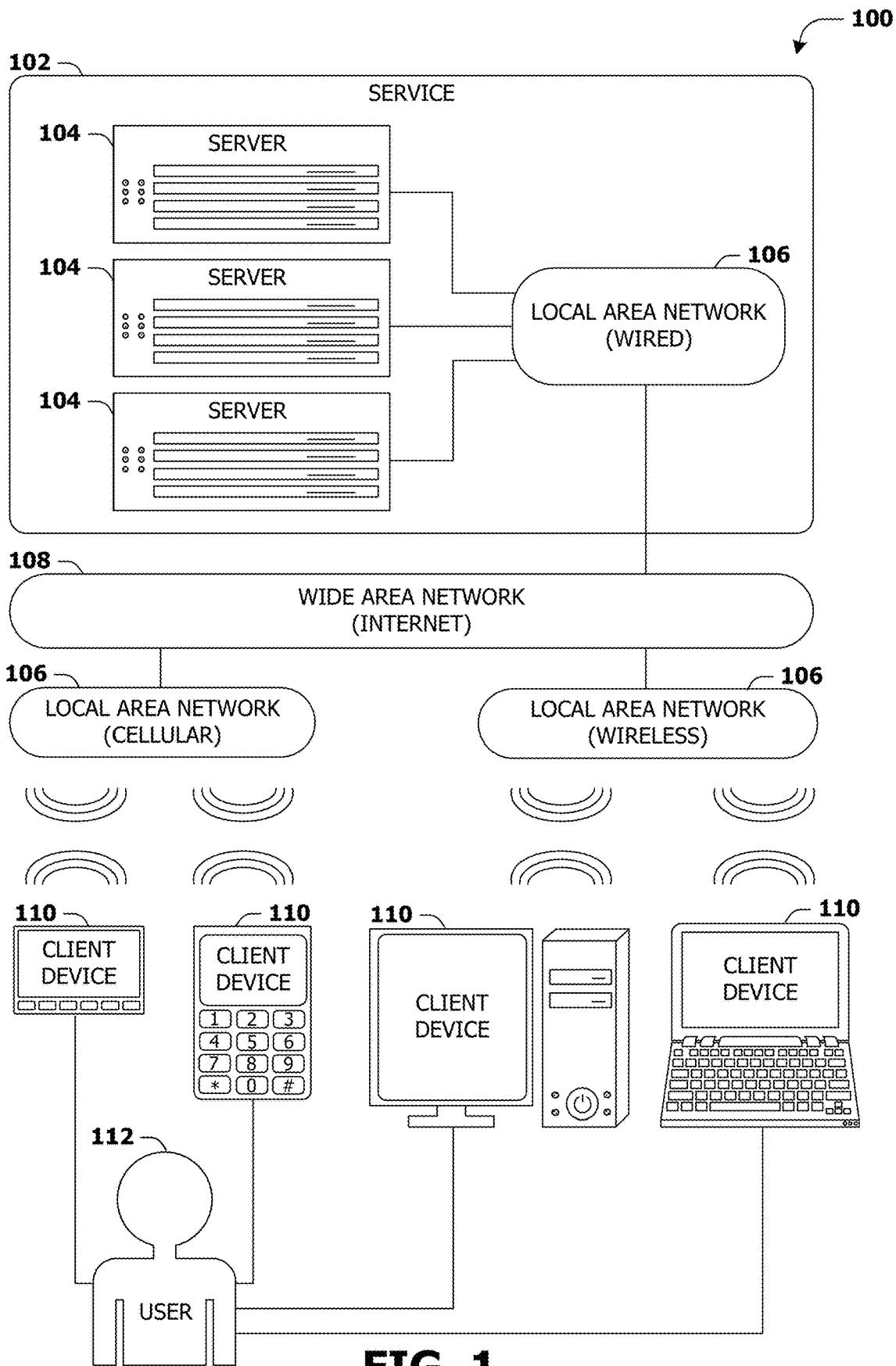
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
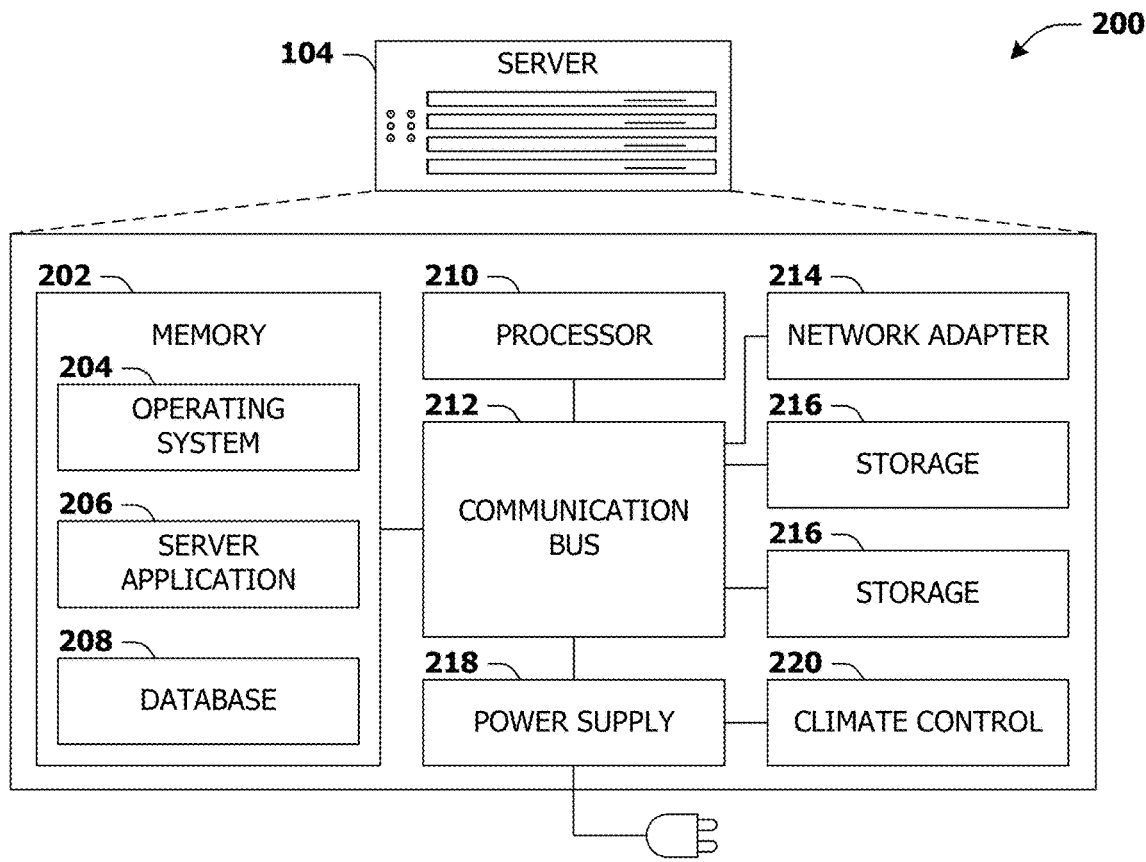
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
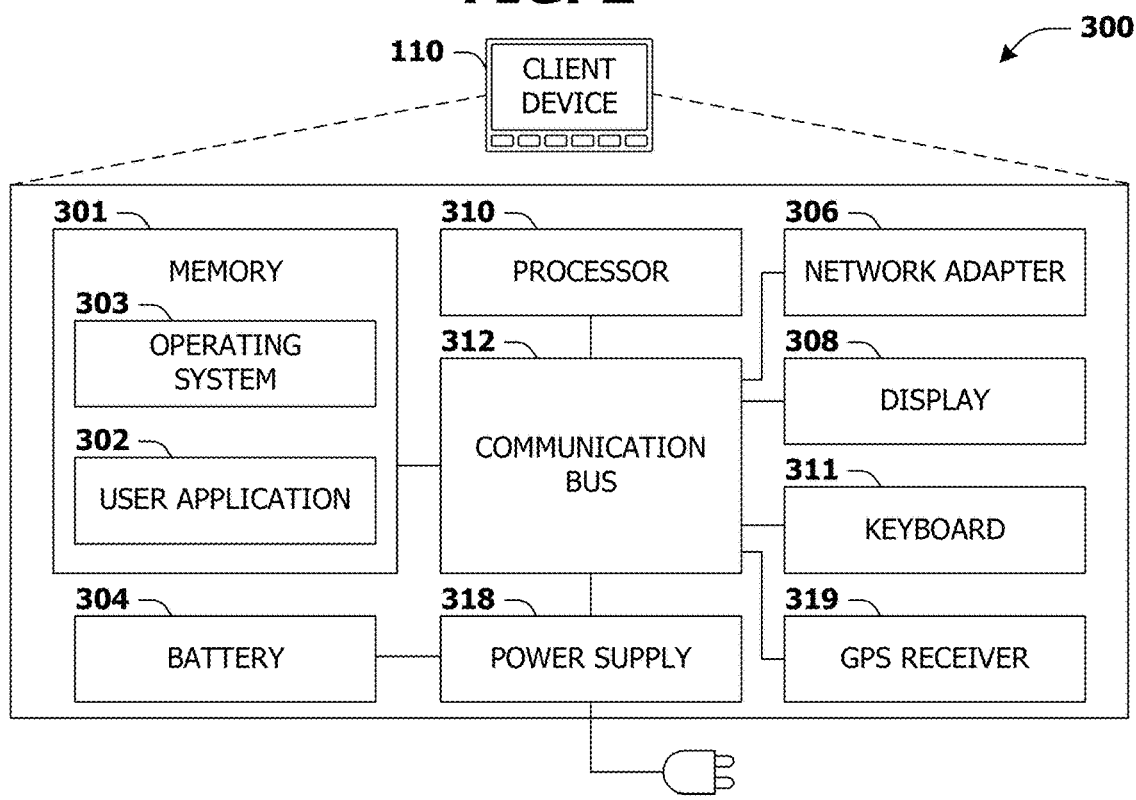
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for presenting social interaction interfaces associated with emails are provided. In some examples, a first email sender (e.g., an email sender associated with an organization, a brand, a company, a user, etc.) may send a plurality of related emails to a plurality of email addresses to provide information associated with at least one of a product, a service, a brand, a promotion, a newsletter, an announcement, an update, etc. However, users viewing emails of the plurality of related emails may not be able to socially interact with each other.

Thus, in accordance with one or more of the techniques herein, social interaction interfaces associated with the plurality of related emails may be displayed. In an example, a first social interaction interface associated with a first email of the plurality of related emails may be displayed via a first client device. In some examples, the first social interaction interface may comprise at least one of a commenting feature, a feedback feature, a chat feature, etc. Comments associated with emails of the plurality of related emails may be displayed via a comment section of the commenting feature. Alternatively and/or additionally, a user of the first client device may post comments via the commenting feature. Alternatively and/or additionally, the user may submit a feedback signal (e.g., at least one of a like, dislike, etc.) associated with the first email. Alternatively and/or additionally, the user may have a chat conversation with a chat agent via the chat feature (thus providing for real-time communication between the user and the chat agent). Alternatively and/or additionally, one or more social interaction metrics associated with the plurality of related emails may be displayed. The one or more social interaction metrics may comprise at least one of a comment metric (e.g., a quantity of comments received via social interaction interfaces of the plurality of related emails), a positive feedback signal metric (e.g., a quantity of positive feedback signals received via social interaction interfaces of the plurality of related emails), a negative feedback signal metric (e.g., a quantity of negative feedback signals received via social interaction interfaces of the plurality of related emails), a presentation metric (e.g., a quantity of presentation events of emails of the plurality of related emails), etc. It may be appreciated that displaying the first social interaction interface may enable the user of the first client device to engage with other users who received emails of the plurality of related emails and/or may provide for improved user experience for the user of the first client device.

Alternatively and/or additionally, one or more social interaction metrics associated with the plurality of related emails may be provided to a second client device (e.g., a second client device logged into a business account associated with the first email sender). The one or more social interaction metrics provided to the second client device may be used for marketing analysis. Alternatively and/or additionally, a business account interface may be displayed via the second client device. One or more comments submitted via social interaction interfaces associated with the plurality of related emails may be flagged and/or deleted via the business account interface.

Figure 4:
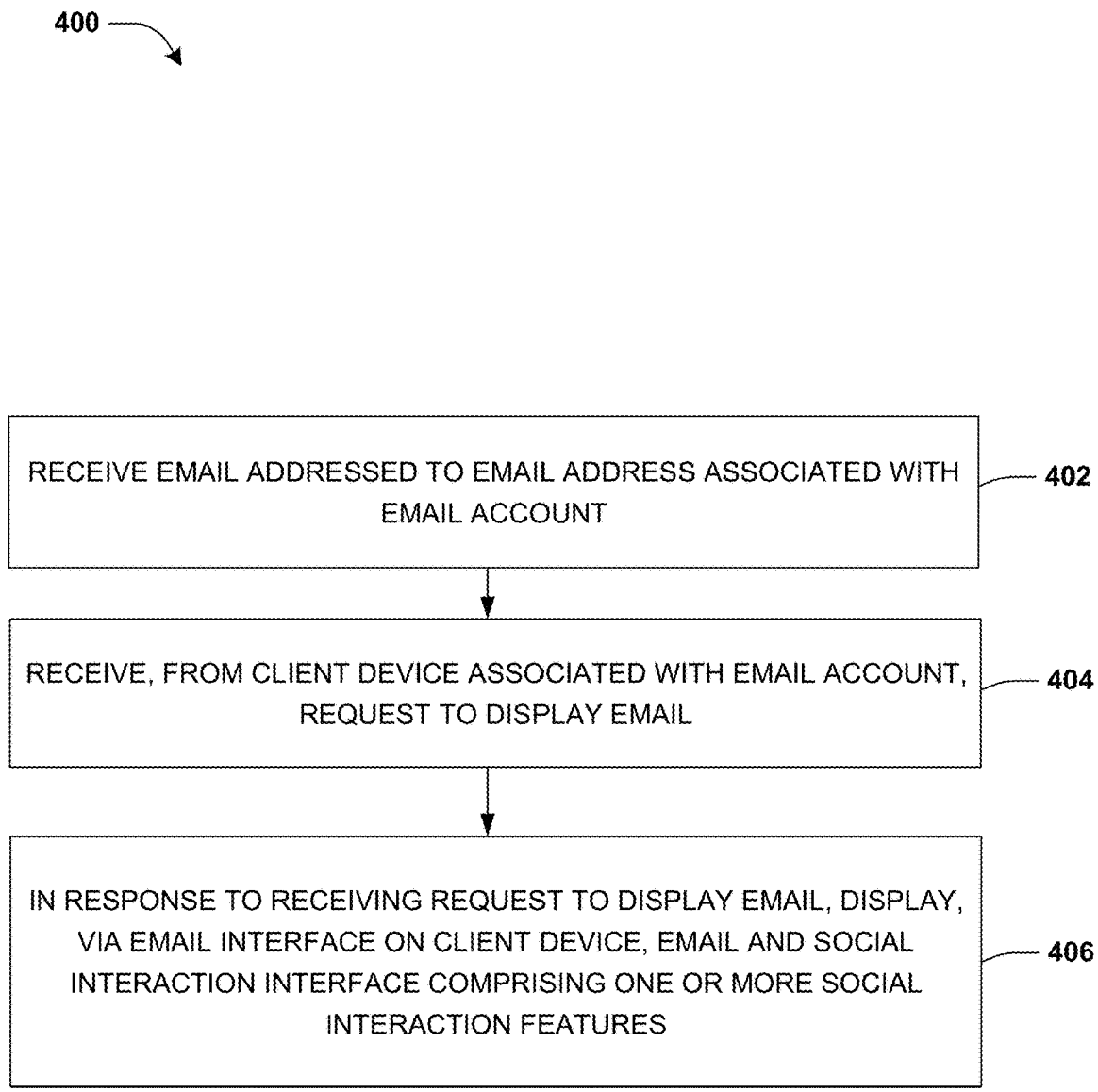
FIG. 4 is a flow chart illustrating an example method for presenting social interaction interfaces associated with emails.

An embodiment of presenting social interaction interfaces associated with emails is illustrated by an example method 400 of FIG. 4, and is further described in conjunction with system 501 of FIGS. 5A-5K.

At 402, a first email addressed to a first email address associated with a first email account may be received. The first email may be received by a communication system (e.g., an email service provider) from a first email sender. The first email may comprise content associated with at least one of an advertisement, a sale, an announcement, a promotion, etc. (e.g., the first email may be sent by the first email sender to promote at least one of the advertisement, the sale, etc.). In an example, the first email sender may be an email account associated with an entity, such as at least one of an advertiser (e.g., an advertiser that advertises products and/or services), a company (e.g., a company that sells products and/or services), a shopping website (e.g., a shopping website with which products and/or services can be purchased), a store (e.g., a store in which products and/or services can be purchased), a brand, an organization, etc. For example, the email account may be used for sending at least one of promotions, marketing material, announcements, newsletters, etc. associated with the entity. In some examples, in response to receiving the first email, the communication system may transmit the first email to a client device associated with the first email account.

In some examples, the first email may be transmitted by a client device associated with the first email sender to a first mail agent (e.g., a first mail transfer agent (MTA) and/or a first mail delivery agent (MDA)). The first mail agent may transmit the first email to a second mail agent (e.g., a second MTA and/or a second MDA) via one or more networks (e.g., via the Internet). The communication system 504 may receive the first email from the second mail agent. Alternatively and/or additionally, the communication system 504 may comprise the second mail agent (e.g., the second mail agent may be a MTA and/or a MDA for the email service provider of the communication system 504).

Figure 5A:
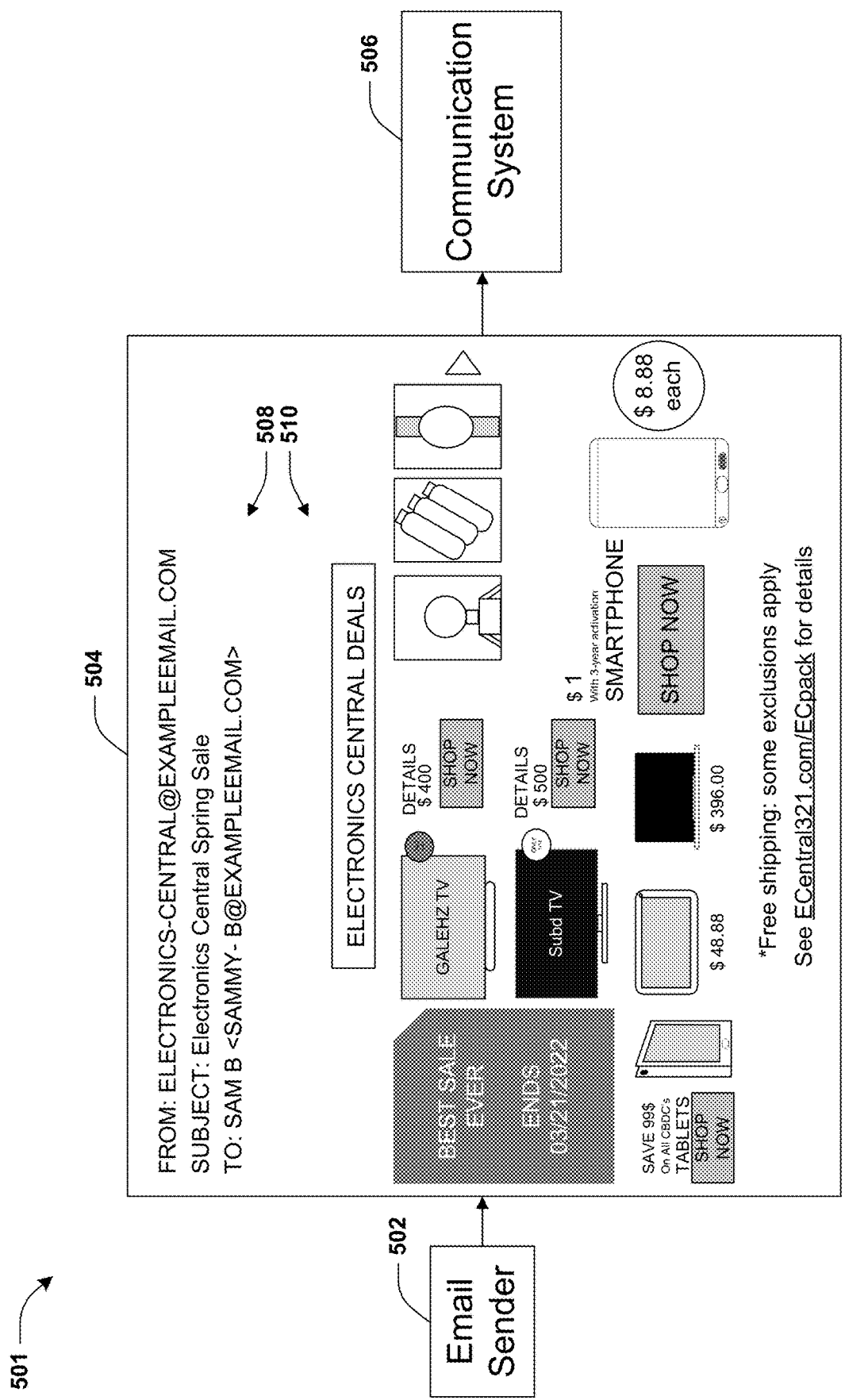
FIG. 5A is a component block diagram illustrating an example system for presenting social interaction interfaces associated with emails, where a first email is received by a communication system.

FIG. 5A illustrates the first email (shown with reference number 504) being received by the communication system (shown with reference number 506) from the first email sender (shown with reference number 502). In an example shown in FIG. 5A, the first email sender 502 may be associated with an electronics store "Electronics Central", wherein the first email 504 may be sent by the first email sender 502 to promote a sale at the electronics store and/or to promote products sold at the electronics store. The first email 504 may comprise an email header 508 comprising at least one of an indication of a first sender email address of the first email sender 502 (e.g., "ELECTRONICS-CENTRAL@EXAMPLEEMAIL.COM" shown in FIG. 5A), an indication of a subject of the first email 504 (e.g., "Electronics Central Spring Sale" shown in FIG. 5A), an indication of the first email address to which the first email 504 is addressed (e.g., "SAMMY-B@EXAMPLEEMAIL.COM" shown in FIG. 5A), an indication of a time that the first email 504 is sent ad/or delivered, an indication of a return-path email address, etc. The first email 504 may comprise an email body 510 comprising content (e.g., text, one or more images, one or more links, etc.). For example, the email body 510 may comprise information associated with prices of products on sale.

Figure 5B:
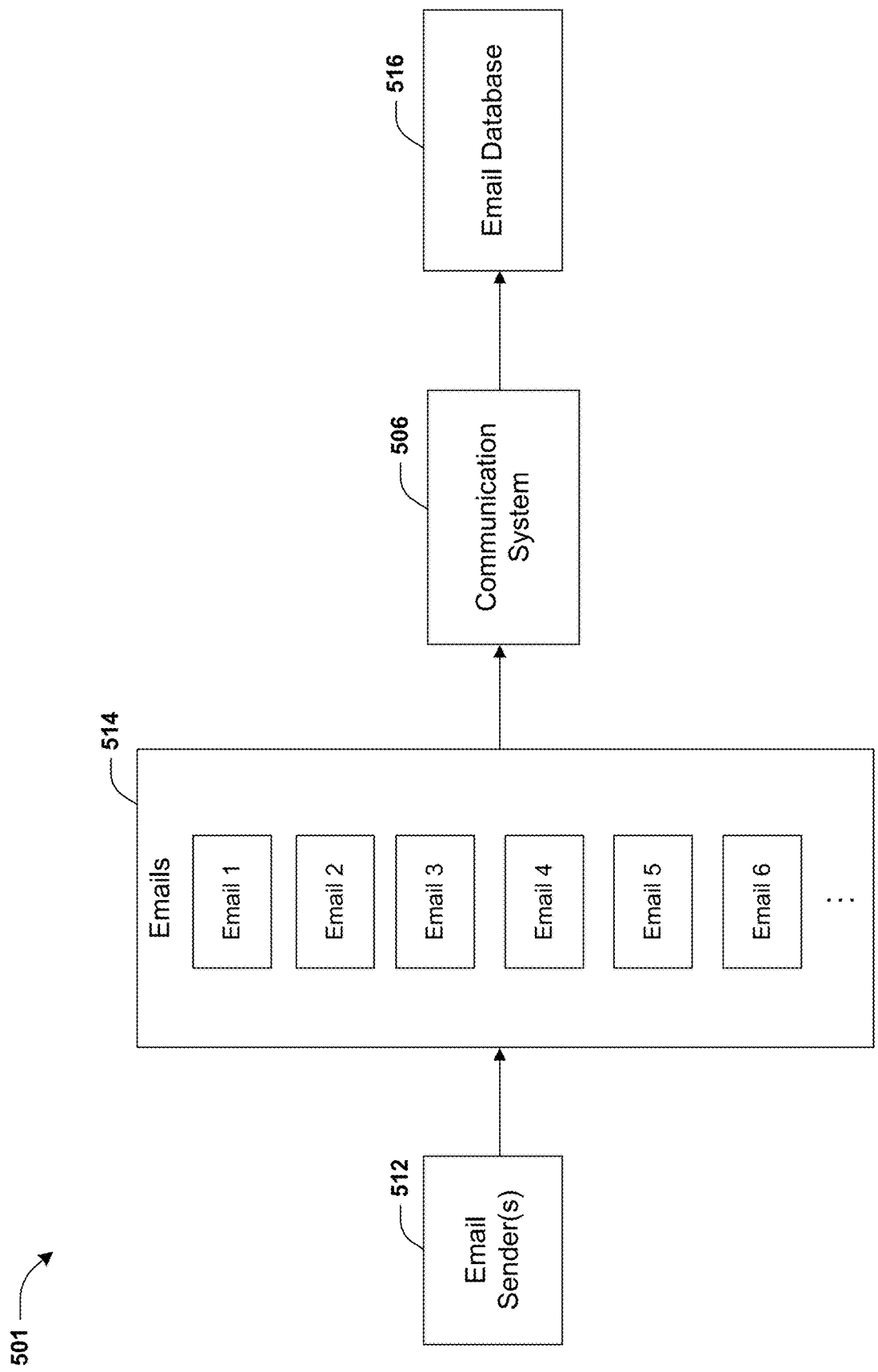
FIG. 5B is a component block diagram illustrating an example system for presenting social interaction interfaces associated with emails, where a communication system receives emails from one or more email senders.

In response to receiving an email, such as the first email 504, from an email sender, the communication system 506 may store the email in an email database. In response to receiving a request to access the email, the communication system 506 may retrieve the email from the email database and/or provide the email to a client device that transmitted the request. FIG. 5B illustrates the communication system 506 receiving emails 514 (e.g., Email 1, Email 2, Email 3, etc.) from one or more email senders 512. The communication system 506 may store the emails 514 in the email database (shown with reference number 516).

In some examples, a first set of related emails comprising the first email 504 may be identified. The first set of related emails may comprise emails that are determined to be related to each other. In an example, emails of the first set of related emails may be identified (and/or may be determined to be related to each other) based upon a determination that the emails have one or more similarities (e.g., matching email type, matching email structure, matching email content, etc.) with each other and/or based upon the emails being grouped together via clustering and/or classification. In an example, a plurality of emails in the email database 516 (e.g., the plurality of emails may comprise the first set of related emails) may be analyzed to group the plurality of emails into one or more groups of emails, wherein the first set of related emails is identified based upon the one or more groups of emails (e.g., the first set of related emails may be a first group of emails of the one or more groups of emails).

In an example, the first set of related emails may be sent (by the first email sender 502, for example) to a plurality of email addresses as part of a promotion campaign (e.g., as shown in FIG. 5A, the first set of related emails may be sent to the plurality of email addresses to promote a sale at the electronics store associated with the first email sender 502 and/or to promote products sold at the electronics store). In an example, the first set of related emails sent (by the first email sender 502, for example) to the plurality of email addresses may comprise a newsletter. In an example, the first set of related emails sent (by the first email sender 502, for example) to the plurality of email addresses may comprise an announcement for users associated with the plurality of email addresses. Email bodies of emails of the first set of related emails may be the same and/or similar to each other. In an example in which the first set of related emails comprises promotional emails, email bodies of the first set of related emails may comprise the same information for promoting the same sale, the same products and/or the same services. In an example in which the first set of related emails comprises newsletter emails, the email bodies may comprise the same newsletter.

Figure 5C:
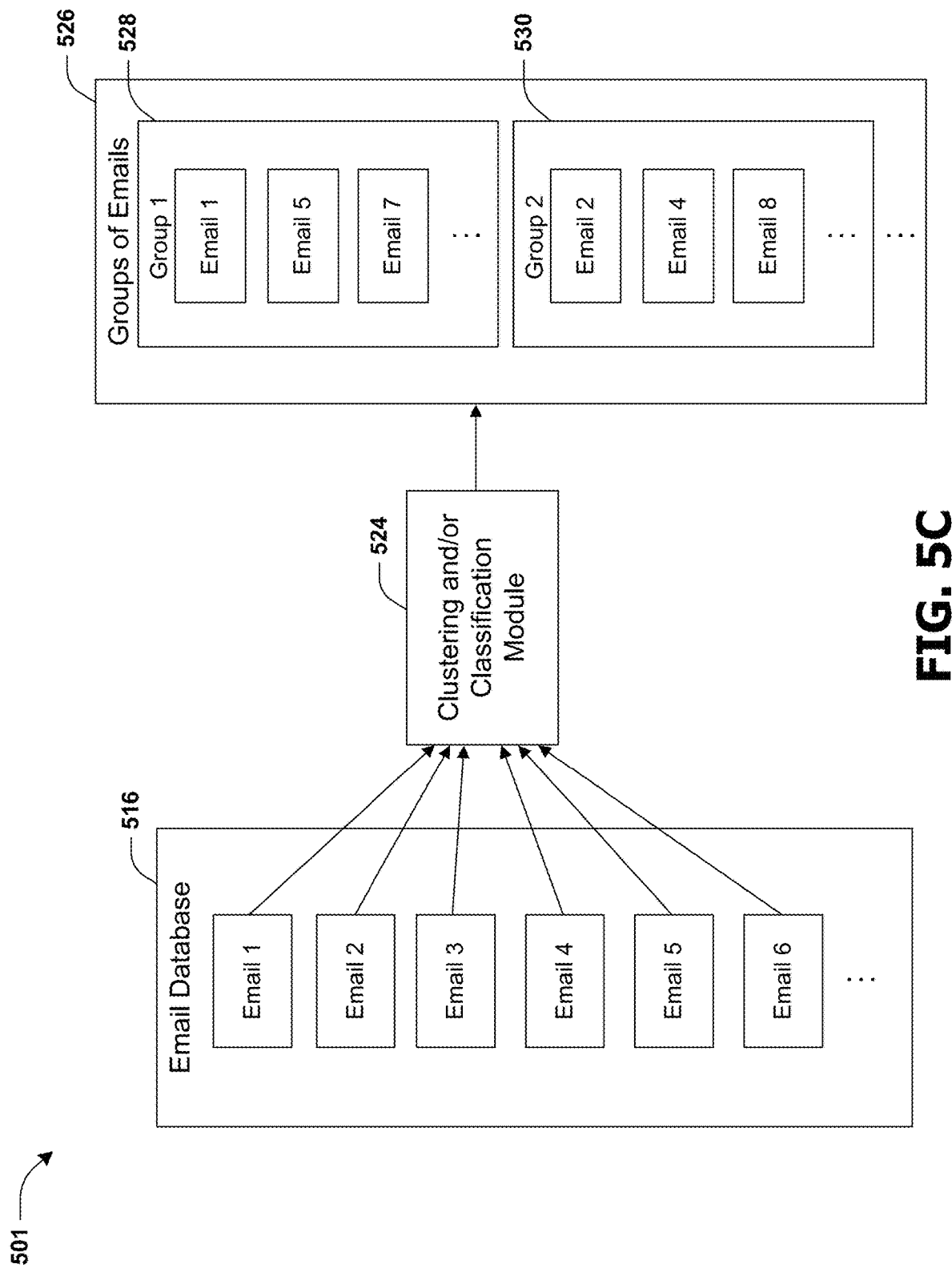
FIG. 5C is a component block diagram illustrating an example system for presenting social interaction interfaces associated with emails, where emails are grouped into a plurality of sets of related emails.

FIG. 5C illustrates the plurality of emails, stored in the email database 516, being grouped into a plurality of sets of related emails 526 (e.g., groups of emails). In an example, the plurality of emails may be grouped into the plurality of sets of related emails 526 using a clustering and/or classification module 524. For example, the clustering and/or classification module 524 may determine classifications for emails of the plurality of emails and/or cluster the emails into the plurality of sets of related emails 526 based upon the classifications (e.g., emails may be included in a set of related emails based upon the same classification being determined for each email of the emails). In an example, the plurality of sets of related emails 526 may comprise the first set of related emails (e.g., "Group 1" shown with reference number 528), a second set of related emails 530 (e.g., "Group 2"), etc.

In some examples, the plurality of emails may be grouped into the plurality of sets of related emails 526 based upon at least one of email types of emails of the plurality of emails, structures of emails of the plurality of emails, email content of emails of the plurality of emails, times of emails of the plurality of emails, metadata of emails of the plurality of emails, etc.

In an example, emails (comprising the first email 504) may be included in (e.g., grouped into) the first set of related emails 528 based upon a determination that the emails have matching email types. An email type may correspond to at least one of a business email type (e.g., an email with business-related content sent to members and/or clients of a business), a promotional email type (e.g., an email promoting products, services and/or a sales event), a news email type (e.g., an email with information about current events), etc. In some examples, emails received by the communication system 506 may be analyzed to determine email types of the emails. For example, the email types may be determined based upon at least one of email senders of the emails (e.g., it may be determined that an email corresponds to the promotional email type based upon a determination that an email sender of the email is associated with an advertising email account used for advertising at least one of a company, a brand, a product, etc.), content of the emails (e.g., it may be determined that an email corresponds to the news email type based upon a determination that the email comprises links to news articles), etc. In an example, emails (comprising the first email 504) may be included in (e.g., grouped into) the first set of related emails 528 based upon a determination that email types of the emails match each other (e.g., the email types of the emails may be determined to match each other based upon the email types being the same).

In an example, emails (comprising the first email 504) may be included in (e.g., grouped into) the first set of related emails 528 based upon a determination that the emails have matching content. Content of an email may comprise at least one of an email body of the email, an email header of the email, text in the email, one or more images in the email, one or more links in the email, etc. In an example, emails (comprising the first email 504) may be included in (e.g., grouped into) the first set of related emails 528 based upon a determination that email bodies of the emails match each other (e.g., the email bodies of the emails may be determined to match each other based upon the email bodies being the same and/or based upon a determination that similarities between the email bodies exceed a threshold similarity). In an example, emails (comprising the first email 504) may be included in (e.g., grouped into) the first set of related emails 528 based upon a determination that email headers of the emails match each other (e.g., the email headers of the emails may be determined to match each other based upon the email headers being the same and/or based upon a determination that similarities between the email headers exceed a threshold similarity). In an example, emails (comprising the first email 504) may be included in (e.g., grouped into) the first set of related emails 528 based upon a determination that email metadata of the emails match each other (e.g., the email metadata of the emails may be determined to match each other based upon the email metadata being the same and/or based upon a determination that similarities between the email metadata exceed a threshold similarity). In an example, emails (comprising the first email 504) may be included in (e.g., grouped into) the first set of related emails 528 based upon a determination that email text of the emails match each other (e.g., the email text of the emails may be determined to match each other based upon the email text of the emails being the same and/or based upon a determination that similarities between the email text of the emails exceed a threshold similarity). In an example, emails (comprising the first email 504) may be included in (e.g., grouped into) the first set of related emails 528 based upon a determination that email images of the emails match each other (e.g., the email images of the emails may be determined to match each other based upon the email images being the same and/or based upon a determination that similarities between the email images exceed a threshold similarity). In an example, emails (comprising the first email 504) may be included in (e.g., grouped into) the first set of related emails 528 based upon a determination that email links of the emails match each other (e.g., the email links of the emails may be determined to match each other based upon the email links being the same and/or based upon a determination that similarities between the email links exceed a threshold similarity).

In an example, emails (comprising the first email 504) may be included in (e.g., grouped into) the first set of related emails 528 based upon a determination that the emails have matching metadata. Metadata of an email may comprise at least one of product identification information (e.g., one or more stock keeping units (SKUs)) of one or more products indicated in the email, one or more prices of one or more products indicated in the email, an electronic categorization of the email, a type of product indicated in the email, etc. In some examples, email metadata of emails may be stored in an email metadata database (e.g., the emails may be analyzed to determine the email metadata). The email metadata database may be used for clustering emails into sets of related emails. In some examples, email metadata of an email may be determined and/or stored in the email metadata database in response to receiving the email (e.g., the email may be analyzed to determine the email metadata). In an example, emails (comprising the first email 504) may be included in (e.g., grouped into) the first set of related emails 528 based upon a determination that product identification information (e.g., SKUs) of the emails match each other (e.g., the SKUs of the emails may be determined to match each other based upon the SKUs being the same and/or based upon a determination that similarities between the SKUs exceed a threshold similarity). In an example, emails (comprising the first email 504) may be included in (e.g., grouped into) the first set of related emails 528 based upon a determination that prices of one or more products indicated by the emails match each other (e.g., the prices indicated by the emails may be determined to match each other based upon the prices being the same and/or based upon a determination that similarities between the prices exceed a threshold similarity). In an example, emails (comprising the first email 504) may be included in (e.g., grouped into) the first set of related emails 528 based upon a determination that types of products indicated by the emails match each other (e.g., the types of products indicated by the emails may be determined to match each other based upon the types of products being the same and/or based upon a determination that similarities between the types of products exceed a threshold similarity). In an example, emails (comprising the first email 504) may be included in (e.g., grouped into) the first set of related emails 528 based upon a determination that electronic categorizations of the emails match each other (e.g., the electronic categorizations of the emails may be determined to match each other based upon the electronic categorizations being the same and/or based upon a determination that similarities between the electronic categorizations exceed a threshold similarity).

In an example, emails (comprising the first email 504) may be included in (e.g., grouped into) the first set of related emails 528 based upon a determination that the emails have matching structures (e.g., email structures). Structure of an email may correspond to at least one of an email layout of the email (e.g., email layout may correspond to an arrangement of at least one of text, images, links, etc. in the email), email formatting of the email (e.g., email formatting may correspond to at least one of one or more sizes of one or more components such as one or more images, one or more fonts of text, etc.), email borders of the email, etc. In an example, emails (comprising the first email 504) may be included in (e.g., grouped into) the first set of related emails 528 based upon a determination that email structures of the emails match each other (e.g., the email structures of the emails may be determined to match each other based upon the email structures being the same and/or based upon a determination that similarities between the email structures exceed a threshold similarity). In some examples, the emails may be analyzed to determine the email structures of the emails.

In an example, emails (comprising the first email 504) may be included in (e.g., grouped into) the first set of related emails 528 based upon a determination that times associated with the emails are the same and/or are within a time window. In an example, a window size of the time window may be set to a threshold window size (e.g., 30 minutes, 1 hour, etc.). A time associated with an email may be based upon (e.g., equal to) at least one of a time that the email is sent (e.g., a time indicated by an email header of the email), a time that the communication system 506 receives the email, etc. In an example, emails may be included in the first set of related emails 528 based upon a determination that the emails are sent (and/or received by the communication system 506) within a 30-minute time window.

In an example, emails (comprising the first email 504) may be included in (e.g., grouped into) the first set of related emails 528 based upon a determination that a sender email address associated with the emails are the same. In an example, the sender email address may be indicated by email headers of the emails. In an example, the sender email address may be the first sender email address of the first email sender 502.

In some examples, the first email 504 may be determined to be a social interaction-activated email based upon a determination that a quantity of emails of the first set of related emails 528 exceeds a threshold quantity of emails (e.g., 50 emails, 100 emails, 1000 emails or other quantity of emails). Alternatively and/or additionally, if the quantity of emails of the first set of related emails 528 does not exceed the threshold quantity of emails, the first email 504 may not be determined to be a social interaction-activated email. Alternatively and/or additionally, the first set of related emails 528 may be determined to be social interaction-activated emails based upon the determination that the quantity of emails of the first set of related emails 528 exceed the threshold quantity of emails.

Alternatively and/or additionally, the first set of related emails 528 may be identified based upon a social interaction activation message. For example, the social interaction activation message may be indicative of the first set of related emails 528 (e.g., the social interaction activation message may indicate that emails of the first set of related emails 528 are related to each other). The social interaction activation message may be received from a client device associated with the first email sender 502 (e.g., the first email sender 502 that composed and/or sent the first set of related emails 528). Alternatively and/or additionally, the social interaction activation message may indicate that emails of the first set of related emails 528 are social interaction-activated emails. In an example, the social interaction activation message may be sent to indicate that the first set of related emails 528 are social interaction-activated emails and/or that the emails of the first set of related emails 528 are related to each other.

In some examples, based upon a determination that an email is a social interaction-activated email, a social interaction interface may be displayed in association with displaying the email. For example, based upon the determination that the first email 504 is a social interaction-activated email, a social interaction interface may be displayed in association with displaying the first email 504 (e.g., using one or more of the techniques provided herein, such as discussed with respect to act 406 and/or FIGS. 5F-5H).

In some examples, based upon identification of a set of related emails (e.g., a group of emails) comprising social interaction-activated emails, a social interaction dataset associated with the set of related emails may be generated. The social interaction dataset may be updated based upon social interaction signals received in association with the social interaction-activated emails.

In some examples, for each set of related emails of the plurality of sets of related emails 526, a classification may be determined for emails of the set of related emails. In an example, the classification may be indicative of template information and/or a group identifier (ID) (e.g., a template ID) for emails of the set of related emails. In some examples, the template information may be indicative of at least one of an email type of emails of the set of related emails, an email structure of emails of the set of related emails, email content of emails of the set of related emails, etc. Alternatively and/or additionally, the classification may be assigned to emails of the set of related emails. Alternatively and/or additionally, an indication of the classification may be added to metadata of emails of the set of related emails. In an example, metadata of each email of the set of related emails may comprise an indication of the classification of the set of related emails. Accordingly, it may be determined that an email belongs to the set of related emails based upon a determination that the classification associated with the set of related emails is assigned to the email (e.g., based upon an indication of the classification in metadata of the email).

First classification information may be determined based upon the first set of related emails 528. The first classification information may be indicative of first template information and/or a first ID associated with the first set of related emails 528 (e.g., the first ID may correspond to a group ID and/or a template ID for emails of the first set of related emails 528). In some examples, the first template information may be indicative of at least one of an email type of emails of the first set of related emails 528, an email structure of emails of the first set of related emails 528, email content of emails of the first set of related emails 528, etc. Alternatively and/or additionally, the first classification information and/or the first ID may be assigned to emails of the first set of related emails 528. Alternatively and/or additionally, an indication of the first classification information (e.g., the indication may be the first ID) may be added to metadata of emails of the first set of related emails 528. In an example, metadata of each email of the first set of related emails 528 may comprise the first ID associated with the first set of related emails 528. Accordingly, it may be determined that an email belongs to the first set of related emails 528 based upon a determination that the first classification information and/or the first ID is assigned to the email (e.g., based upon the first ID in metadata of the email).

In some examples, a first social interaction dataset may be generated based upon the first classification information (and/or the first set of related emails 528). In an example, the first social interaction dataset may comprise the first classification information (and/or the first template information and/or the first ID) and/or other information associated with the first set of related emails 528. The first social interaction dataset may be stored in a social interaction database. In some examples, the social interaction database and/or the first social interaction dataset may use one or more data models for data storage and/or data retrieval, such as at least one of graph data model, relational database, document database, non-relational database, etc. The social interaction database may comprise a plurality of social interaction datasets associated with sets of related emails (e.g., email groups). For example, for each set of related emails of the sets of related emails, a social interaction dataset associated with the set of related emails may be generated and/or stored in the social interaction database. In an example, social interaction datasets of the plurality of social interaction datasets (other than the first social interaction dataset) may be generated and/or updated using one or more of the techniques provided herein with respect to the first social interaction dataset.

Figure 5D:
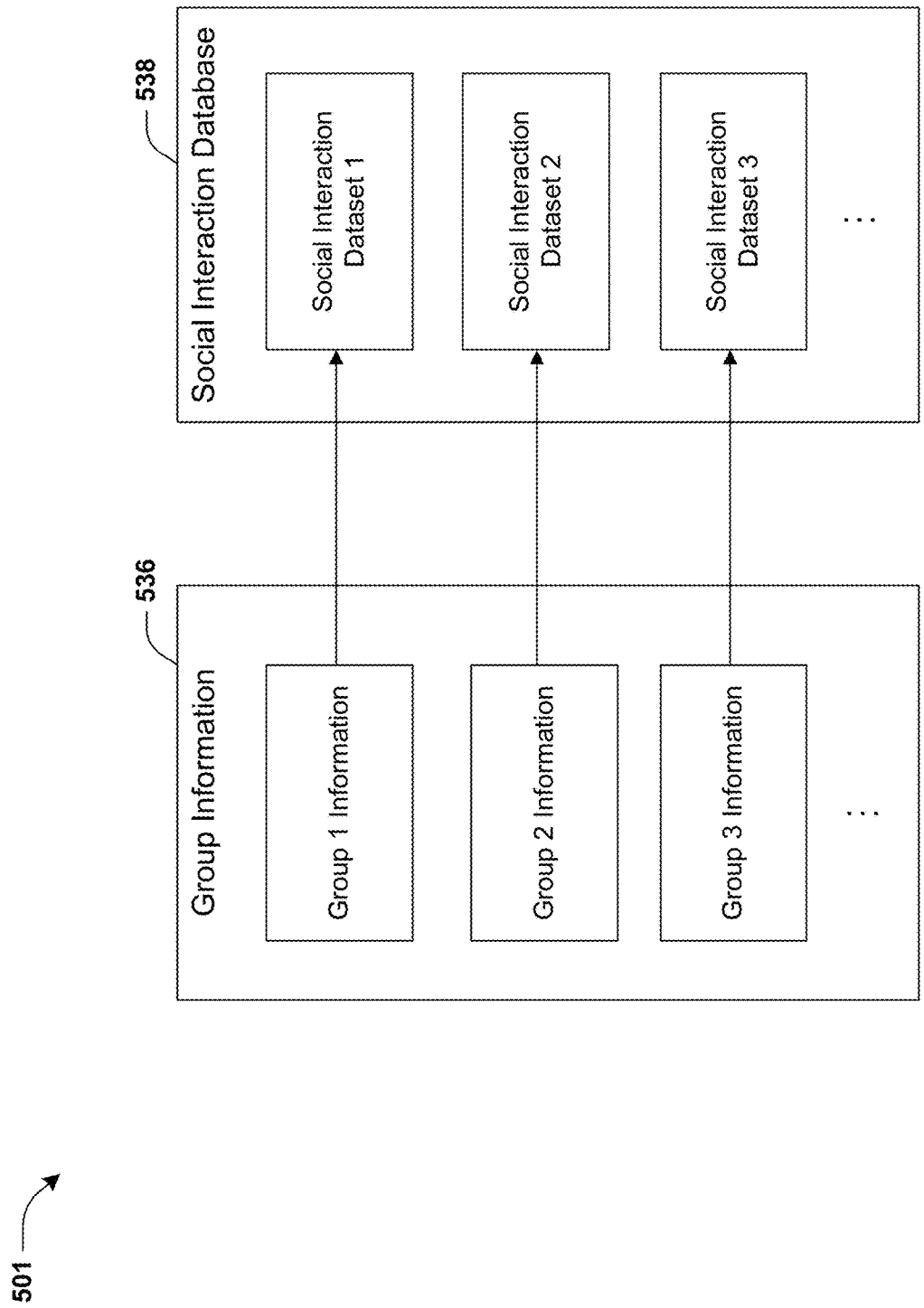
FIG. 5D is a component block diagram illustrating an example system for presenting social interaction interfaces associated with emails, where a plurality of sets of group information is stored in a social interaction database.

FIG. 5D illustrates a plurality of sets of group information 536 being stored in the social interaction database (shown with reference number 538). In some example, the social interaction database 538 may comprise the first social interaction dataset "Social interaction Dataset 1", a second social interaction dataset "Social interaction Dataset 2", etc. For example, first group information "Group 1 Information" associated the first set of related emails 528 may be stored in the first social interaction dataset, second group information "Group 2 Information" may be stored in the second social interaction dataset, etc. The group information 536 may be generated based upon the plurality of sets of related emails 526. For example, the first group information may be generated based upon the first set of related emails 528, the second group information may be generated based upon the second set of related emails 530, etc. In an example, the first group information may comprise the first classification information and/or other information associated with the first social interaction dataset. The first group information stored in the first social interaction dataset may comprise the first ID associated with the first set of related emails 528.

At 404, a first request to display the first email 504 may be received. For example, the first request may be received from a first client device associated with the first email account. The first client device may comprise at least one of a laptop, a desktop computer, a phone, a computer, a wearable device, a smart device, a television, any other type of computing device, hardware, etc. The first request may be received via a first email interface associated with the first email account. The first request may be received when at least one of a browser (e.g., a web browser), an application (e.g., at least one of a mobile application, a web application, an email application, etc.), etc. of the first client device is logged into the first email account and/or authorized to access the first email 504. In some examples, the first request may be transmitted by at least one of the browser, the application, etc. of the first client device.

Figure 5E:
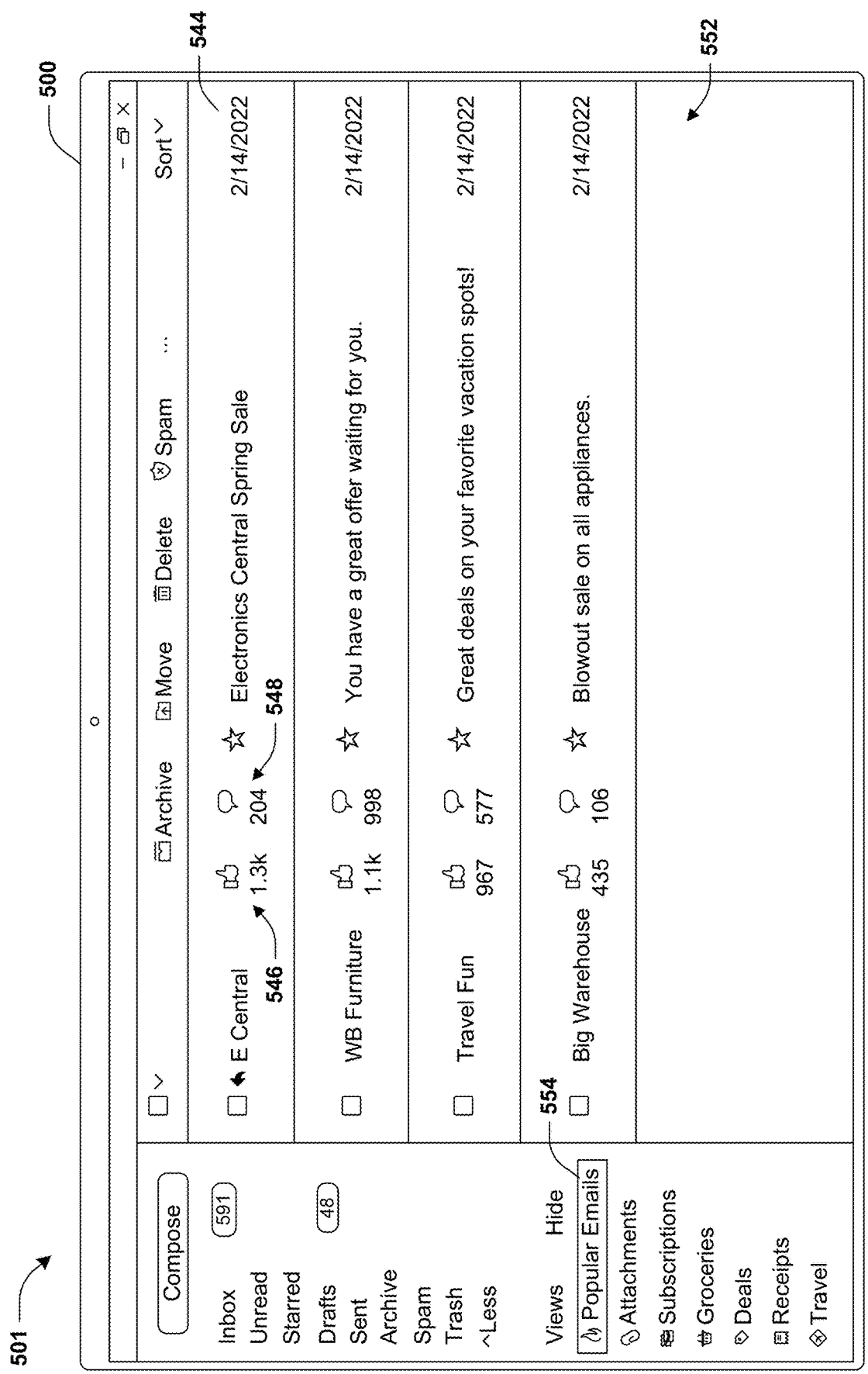
FIG. 5E is a component block diagram illustrating an example system for presenting social interaction interfaces associated with emails, where a first email interface is displayed via a first client device.

FIG. 5E illustrates the first email interface being displayed via the first client device (shown with reference number 500). In an example, the first email interface may display a list of email items 552. The list of email items 552 may comprise a first email item 544 associated with the first email 504. In some examples, in response to a selection of an email item of the list of email items 552, an email associated with the email item may be displayed. The list of email items 552 may be a list of social interaction-activated email items (e.g., email items associated with social interaction-activated emails). For example, in response to a selection of an email item (e.g., a social interaction-activated email item) of the list of email items 552, an email (e.g., a social interaction-activated email) associated with the email item and a social interaction interface associated with the email may be displayed.

In some examples, an order in which email items of the list of email items 552 are displayed in the list of email items 552 (e.g., an arrangement of email items of the list of email items 552) may be based upon social interaction metrics associated with emails associated with the email items. In an example, the social interaction metrics may comprise at least one of comment metrics associated with the emails, feedback signal metrics (e.g., positive feedback signal metrics and/or negative feedback signal metrics) associated with the emails, presentation metrics associated with the emails, etc.

In an example, the comment metrics of the social interaction metrics may comprise a first comment metric associated with the first email 504. The first comment metric may be based upon (e.g., equal to) a quantity of comments, associated with emails of the first set of related emails 528, received via social interaction interfaces (e.g., received from recipients of the emails of the first set of related emails 528).

In an example, the feedback signal metrics associated with the emails may comprise a first positive feedback signal metric associated with the first email 504 and/or a first negative feedback signal metric associated with the first email 504. In an example, the first positive feedback signal metric may be based upon (e.g., equal to) a quantity of positive feedback signals (e.g., at least one of likes, upvotes, etc.), associated with emails of the first set of related emails 528, received via social interaction interfaces. In an example, the first negative feedback signal metric may be based upon (e.g., equal to) a quantity of negative feedback signals (e.g., at least one of dislikes, downvotes, etc.), associated with emails of the first set of related emails 528, received via social interaction interfaces (e.g., received from recipients of the emails of the first set of related emails 528).

In an example, the presentation metrics of the social interaction metrics may comprise a first presentation metric associated with the first email 504. The first presentation metric may be based upon (e.g., equal to) a quantity of presentation events of emails of the first set of related emails 528 (e.g., a quantity of times that emails of the first set of related emails 528 are viewed).

In an example shown in FIG. 5E, the order in which email items of the list of email items 552 are displayed in the list of email items 552 (e.g., an arrangement of email items of the list of email items 552) is based upon positive feedback signal metrics associated with emails associated with the email items. For example, the first email item 544 may be displayed above other email items of the list of email items 552 based upon the first positive feedback signal metric associated with the first email being greater than other positive feedback signal metrics associated with other email items in the list of email items 552. Alternatively and/or additionally, the order in which email items of the list of email items 552 are displayed in the list of email items 552 may be based upon at least one of comment metrics, presentation metrics, etc. associated with emails associated with the email items.

Alternatively and/or additionally, the order in which email items of the list of email items 552 are displayed in the list of email items 552 may be based upon one or more arrangement settings (e.g., user-input arrangement settings received via the first email interface). In an example, the one or more arrangement settings may be indicative of at least one of arranging the email items in decreasing order of comment metrics (e.g., email items associated with higher comment metrics may be displayed above email items associated with lower comment metrics), arranging the email items in increasing order of comment metrics (e.g., email items associated with lower comment metrics may be displayed above email items associated with higher comment metrics), arranging the email items in decreasing order of presentation metrics (e.g., email items associated with higher presentation metrics may be displayed above email items associated with lower presentation metrics), arranging the email items in increasing order of presentation metrics (e.g., email items associated with lower presentation metrics may be displayed above email items associated with higher presentation metrics), arranging the email items in decreasing order of positive feedback signal metrics (e.g., email items associated with higher positive feedback signal metrics may be displayed above email items associated with lower positive feedback signal metrics), arranging the email items in increasing order of positive feedback signal metrics (e.g., email items associated with lower positive feedback signal metrics may be displayed above email items associated with higher positive feedback signal metrics), arranging the email items in decreasing order of negative feedback signal metrics (e.g., email items associated with higher negative feedback signal metrics may be displayed above email items associated with lower negative feedback signal metrics), arranging the email items in increasing order of negative feedback signal metrics (e.g., email items associated with lower negative feedback signal metrics may be displayed above email items associated with higher negative feedback signal metrics), etc.

In some examples, the list of email items 552 may correspond to a list of popular email items. For example, the list of popular email items may be displayed in response to a selection of a selectable input 554. In some examples, the list of popular email items may comprise email items associated with emails that are associated with one or more social interaction metrics (e.g., at least one of comment metrics, feedback signal metrics, presentation metrics, etc.) that exceed one or more threshold metrics. In an example, the first email item 544 associated with the first email 504 may be included in the list of popular email items based upon a determination that at least one of the first comment metric exceeds a threshold comment metric, the first positive feedback signal metric exceeds a threshold positive feedback signal metric, the first presentation metric exceeds a threshold presentation metric, etc.

In some examples, indications of social interaction metrics associated with social interaction-activated email items of the list of email items 552 may be displayed. In an example, the first email item 544 may comprise an indication 546 of the first positive feedback signal metric associated with the first email 504 (e.g., the indication 546 of the first positive feedback signal metric indicates that about 1,300 likes associated with the first set of related emails 528 have been received). Alternatively and/or additionally, the first email item 544 may comprise an indication 548 of the first comment metric associated with the first email 504 (e.g., the indication 548 of the first comment metric indicates that 204 comments associated with the first set of related emails 528 have been received and/or are available to view).

Accordingly, using one or more of the techniques herein for displaying the list of email items 552 (e.g., arranging email items based upon social interaction metrics and/or by displaying indications of social interaction metrics associated with the email items), a user viewing the list of email items 552 may be able to determine which emails are more popular and/or interesting to the user and/or the user may more easily and/or conveniently choose to open an email that the user is interested in.

In some examples, a first set of social interaction metrics associated with the first email 504 (e.g., the first set of social interaction metrics may be associated with the first set of related emails 528) may be based upon first social interaction information stored in the first social interaction dataset of the social interaction database 538. In an example, the first set of social interaction metrics may comprise the first comment metric (e.g., a quantity of the comments in the first social interaction information), the first positive feedback signal metric (e.g., a quantity of the positive feedback signals), the first negative feedback signal metric (e.g., a quantity of the negative feedback signals), the first presentation metric (e.g., a quantity of the presentation events of emails of the first set of related emails 528), etc. In an example, the first social interaction information may be indicative of at least one of comments associated with emails of the first set of related emails 528 (e.g., the comments may be received via social interaction interfaces displayed in association with emails of the first set of related emails 528), feedback signals (e.g., positive feedback signals and/or negative feedback signals) associated with emails of the first set of related emails 528 (e.g., the feedback signals may be received via social interaction interfaces displayed in association with emails of the first set of related emails 528), presentation events of emails of the first set of related emails 528 (e.g., events in which emails of the first set of related emails 528 are presented), the first set of social interaction metrics, etc. The indication 546 of the first positive feedback signal metric and/or the indication 548 of the first comment metric may be based upon the first social interaction information in the first social interaction dataset of the social interaction database 538.

In an example, one or more social interaction signals (e.g., one or more comments, one or more feedback signals, etc.) associated with a second email of the first set of related emails 528 may be received from a second client device associated with the second email. In some examples, the one or more social interaction signals may comprise a feedback signal (e.g., a positive feedback signal such as like and/or upvote, a negative feedback signal such as dislike and/or downvote, etc.) associated with the second email. For example, the feedback signal may be received from the second client device in response to a selection of a feedback selectable input (e.g., a positive feedback selectable input such as a like and/or upvote button, a negative feedback selectable input such as a dislike and/or downvote button, etc.) via a social interaction interface displayed (in association with displaying the second email, for example) via the second client device. Alternatively and/or additionally, the one or more social interaction signals may comprise a comment. For example, the comment may be input (e.g., typed into a comment text field) via the social interaction interface displayed via the second client device. The comment may be received in response to a selection of a comment submission selectable input. The first social interaction dataset may be updated based upon the one or more social interaction signals received from the second client device. In some examples, it may be determined that the one or more social interaction signals are associated with the first set of related emails 528 and/or that the first social interaction dataset (as opposed to other social interaction datasets associated with other sets of related emails, for example) should be updated based upon the one or more social interaction signals based upon a determination that the one or more social interaction signals are associated with (e.g., indicative of) the first ID and/or a determination that the first ID associated with the one or more social interaction signals matches an ID (e.g., the first ID) associated with the first social interaction dataset and/or the first set of related emails 528.

In some examples, updating the first social interaction dataset based upon the one or more social interaction signals comprises adding one or more indications of the one or more social interaction signals to the first social interaction dataset information of the first social interaction dataset and/or updating (e.g., re-computing) one or more metrics of the first set of social interaction metrics based upon the one or more social interaction signals.

In an example in which the one or more social interaction signals comprises the feedback signal, updating the first social interaction dataset based upon the one or more social interaction signals comprises adding an indication of the feedback signal (received from the second client device) to the first social interaction dataset information of the first social interaction dataset. Alternatively and/or additionally, updating the first social interaction dataset based upon the one or more social interaction signals may comprise updating a feedback signal metric (e.g., the first positive feedback signal metric and/or the first negative feedback signal metric) of the first set of social interaction metrics based upon the feedback signal. In an example in which the feedback signal received from the second client device is a positive feedback signal, the first positive feedback signal metric may be updated by incrementing the first positive feedback signal metric. In an example in which the first positive feedback signal metric is indicative of a quantity of 1,310 positive feedback signals (e.g., likes and/or upvotes) prior to receiving the positive feedback signal, in response to receiving the positive feedback signal, the first positive feedback signal metric may be updated to be indicative of a quantity of 1,311 positive feedback signals.

In an example in which the one or more social interaction signals comprises the comment, updating the first social interaction dataset based upon the one or more social interaction signals comprises adding an indication of the comment (received from the second client device) to the first social interaction dataset information of the first social interaction dataset. Alternatively and/or additionally, updating the first social interaction dataset based upon the one or more social interaction signals may comprise updating the first comment metric of the first set of social interaction metrics based upon the comment. In an example, the first comment metric may be updated by incrementing the first comment metric. In an example in which the first comment metric is indicative of a quantity of 203 comments prior to receiving the comment, in response to receiving the comment, the first comment metric may be updated to be indicative of a quantity of 204 comments.

In some examples, the first request may be received in response to a selection of the first email item 544. At 406, in response to receiving the first request, the first email 504 and a first social interaction interface may be displayed via the first email interface. In an example, the first social interaction interface may be displayed based upon a determination that the first email 504 is a social interaction-activated email. In some examples, the first social interaction interface may comprise one or more first social interaction features. A social interaction feature of the one or more social interaction features may comprise at least one of an interface, a selectable input, a graphical object, etc. The one or more first social interaction features may comprise a first commenting feature, a first feedback feature and/or a first chat feature.

The first social interaction interface and/or the first email interface may display social interaction information, from the first social interaction dataset, associated with the first set of related emails 528. In an example, the social interaction information may be retrieved (from the first social interaction dataset) and/or transmitted to the first client device 500 for presentation via the first social interaction interface based upon a determination that the first email 504 is associated with the first set of related emails 528 and/or the first social interaction dataset. For example, it may be determined that the first email 504 is associated with the first set of related emails 528 and/or the first social interaction dataset based upon a determination that the first email 504 and/or the first request are associated with (e.g., indicative of) the first ID and/or a determination that the first ID associated with first email 504 and/or the first request matches an ID (e.g., the first ID) associated with the first social interaction dataset and/or the first set of related emails 528. In an example, the social interaction information provided to the first client device 500 and/or displayed via the first social interaction interface (and/or the first email interface) may be based upon the first social interaction information in the first social interaction dataset.

Figure 5F:
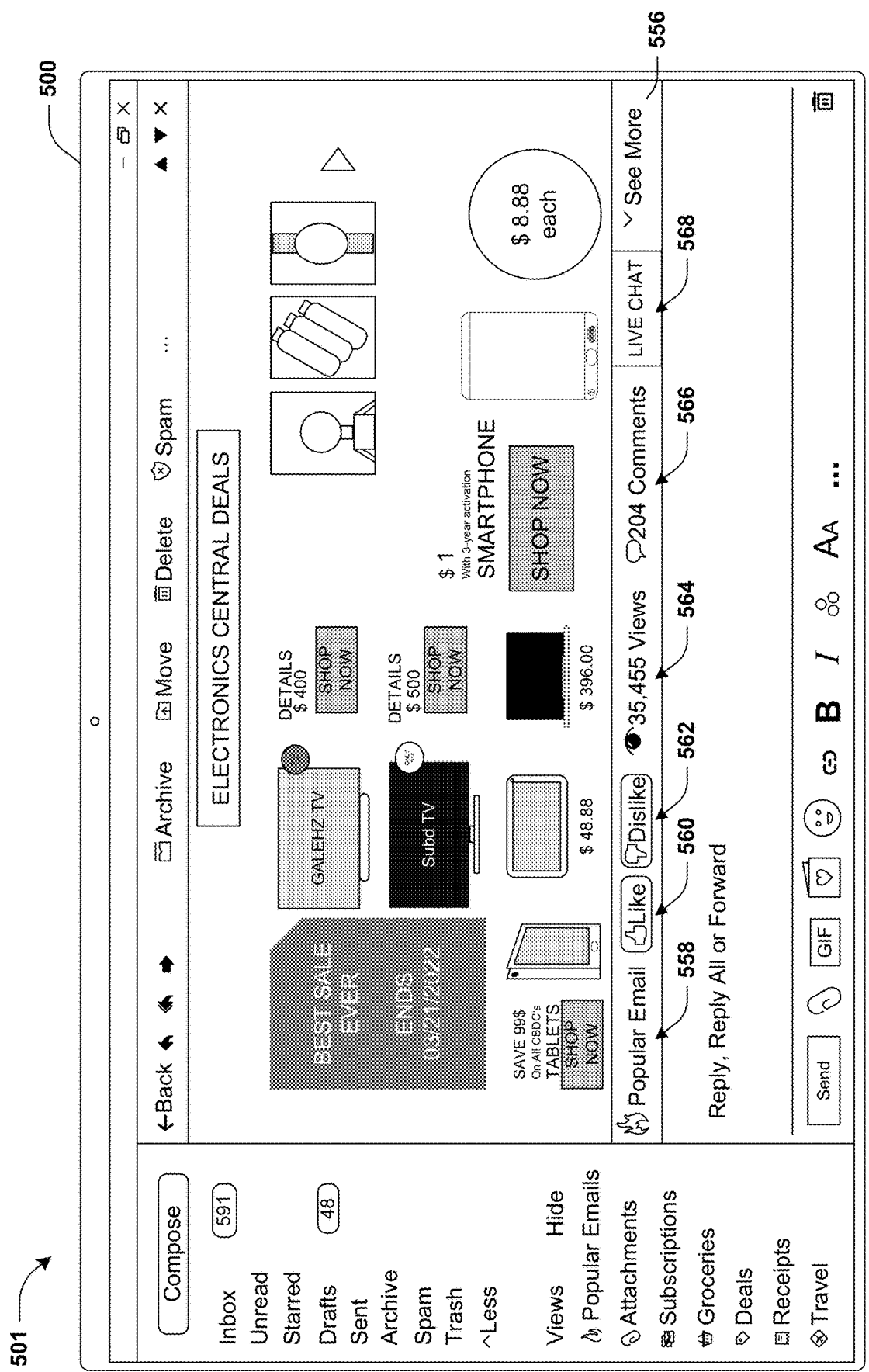
FIG. 5F is a component block diagram illustrating an example system for presenting social interaction interfaces associated with emails, where a first email and a first social interaction interface are displayed via a first email interface.

FIG. 5F illustrates the first email 504 and the first social interaction interface (shown with reference number 556) being displayed via the first email interface. In some examples, the first social interaction interface 556 may display a popular email graphical object 558 indicative of the first email 504 being a popular email. For example, the popular email graphical object 558 may be displayed based upon a determination that at least one of the first comment metric exceeds a threshold comment metric, the first positive feedback signal metric exceeds a threshold positive feedback signal metric, the first presentation metric exceeds a threshold presentation metric, etc.

In some examples, the first social interaction interface 556 may display a first positive feedback graphical object 560 of the first feedback feature. The first positive feedback graphical object 560 may be a selectable input. In an example (not shown), the first positive feedback graphical object 560 may comprise an indication of the first positive feedback signal metric (e.g., the first positive feedback signal metric may be retrieved from the first social interaction dataset associated with the first set of related emails 528). In some examples, in response to a selection of the first positive feedback graphical object 560, a positive feedback signal associated with the first email 504 may be received from the first client device 500. In some examples, in response to receiving the positive feedback signal from the first client device 500, the first social interaction dataset may be updated based upon the positive feedback signal (e.g., an indication of the positive feedback signal may be stored in the first social interaction dataset and/or the first positive feedback signal metric stored in the first social interaction dataset may be incremented based upon the positive feedback signal). In an example, the first social interaction dataset may be updated based upon the positive feedback signal based upon a determination that the positive feedback signal is associated with (e.g., indicative of) the first ID associated with the first social interaction dataset.

In some examples, the first social interaction interface 556 may display a first negative feedback graphical object 562 of the first feedback feature. The first negative feedback graphical object 562 may be a selectable input. In an example (not shown), the first negative feedback graphical object 562 may comprise an indication of the first negative feedback signal metric (e.g., the first negative feedback signal metric may be retrieved from the first social interaction dataset associated with the first set of related emails 528). In some examples, in response to a selection of the first negative feedback graphical object 562, a negative feedback signal associated with the first email 504 may be received from the first client device 500. In some examples, in response to receiving the negative feedback signal from the first client device 500, the first social interaction dataset may be updated based upon the negative feedback signal (e.g., an indication of the negative feedback signal may be stored in the first social interaction dataset and/or the first negative feedback signal metric stored in the first social interaction dataset may be incremented based upon the negative feedback signal). In an example, the first social interaction dataset may be updated based upon the negative feedback signal based upon a determination that the negative feedback signal is associated with (e.g., indicative of) the first ID associated with the first social interaction dataset.

In some examples, the first social interaction interface 556 may display a first presentation event graphical object 564. The first presentation event object 564 may comprise an indication of the first presentation metric (e.g., the first presentation metric may be retrieved from the first social interaction dataset associated with the first set of related emails 528). In some examples, in response to the first email 504 and/or the first social interaction interface 556 being displayed, a presentation event signal (indicative of a presentation event in which the first email 504 is displayed, for example) may be received from the first client device 500. In some examples, in response to receiving the presentation event signal from the first client device 500, the first social interaction dataset may be updated based upon the presentation event signal (e.g., an indication of the presentation event may be stored in the first social interaction dataset and/or the first presentation metric stored in the first social interaction dataset may be incremented based upon the presentation event). In an example, the first social interaction dataset may be updated based upon the presentation event signal based upon a determination that the presentation event signal is associated with (e.g., indicative of) the first ID associated with the first social interaction dataset.

Figure 5G:
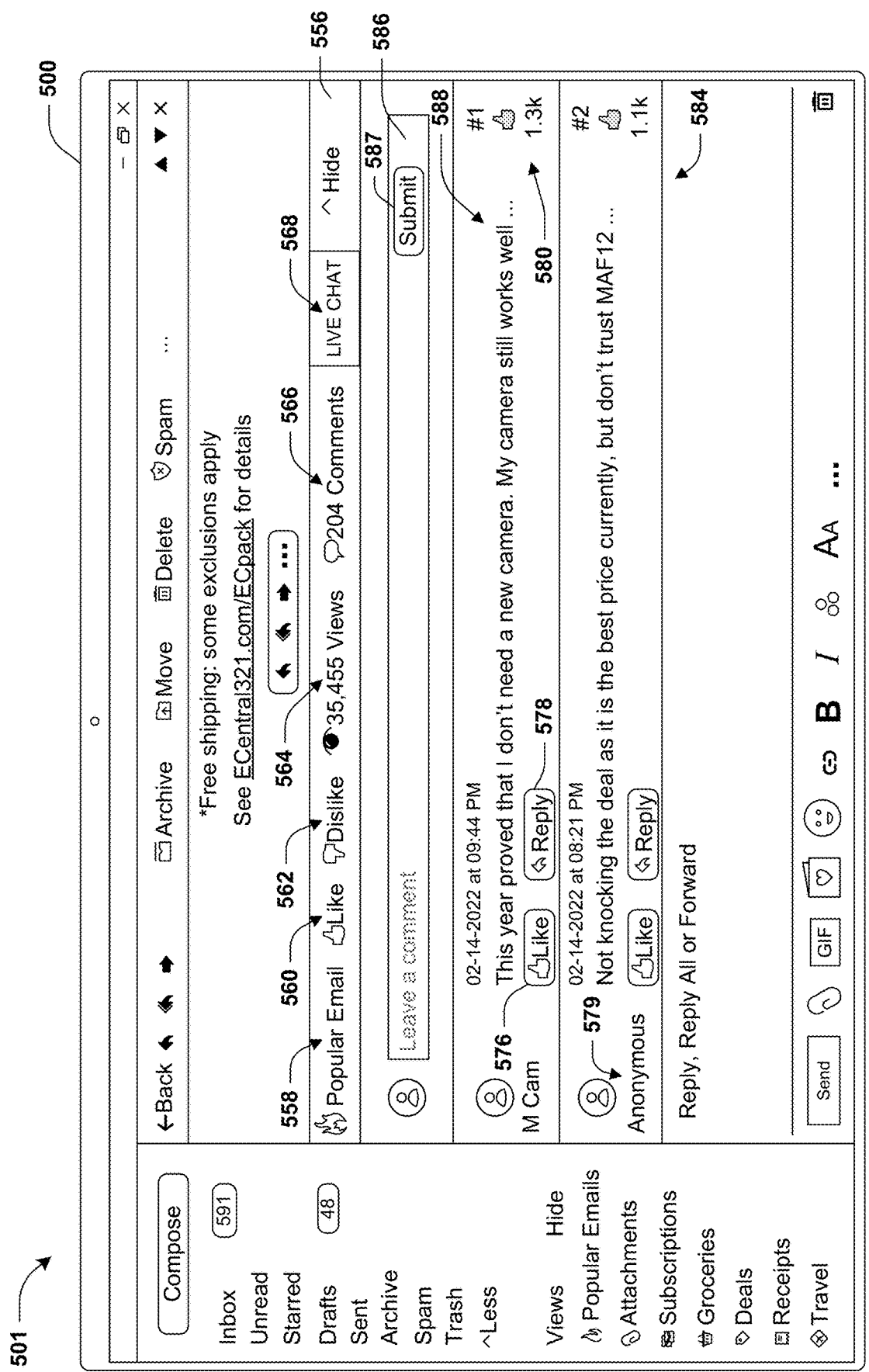
FIG. 5G is a component block diagram illustrating an example system for presenting social interaction interfaces associated with emails, where a comment section of a first social interaction interface is displayed.

In some examples, the first social interaction interface 556 may display a first comment graphical object 566 of the first comment feature. The first comment graphical object 566 may be a selectable input. In an example, the first comment graphical object 566 may comprise an indication of the first comment metric (e.g., the first comment metric may be retrieved from the first social interaction dataset associated with the first set of related emails 528). In some examples, in response to a selection of the first comment graphical object 566, a comment section of the first comment feature may be displayed. FIG. 5G illustrates the comment section (shown with reference number 584) being displayed (in response to a selection of the first comment graphical object 566, for example). The comment section 584 may display one or more comments in the first social interaction dataset associated with the first set of related emails 528 (e.g., the one or more comments may be retrieved from the first social interaction dataset associated with the first set of related emails 528). In an example, the one or more comments may comprise a first comment 588.

In some examples, the comment section 584 may comprise a comment text field 586. In some examples, text may be input via the comment text field 586 (e.g., the text may be typed into the text field 586 and/or may be input via speech recognition) and/or the text may be submitted as a comment in response to a selection of a submit selectable input 587. In some examples, in response to the selection of the submit selectable input 587, the comment (e.g., the text input via the comment text field 586) may be received from the first client device 500. In some examples, in response to receiving the comment from the first client device 500, the first social interaction dataset may be updated based upon the comment (e.g., an indication of the comment may be stored in the first social interaction dataset and/or the first comment metric stored in the first social interaction dataset may be incremented based upon the comment). In an example, the first social interaction dataset may be updated based upon the comment based upon a determination that the comment is associated with the first ID associated with the first social interaction dataset. In some examples, the comment may be displayed via the comment section 584 and/or displayed via social interaction interfaces displayed in association with emails of the first set of related emails 504. In some examples, the comment may be displayed anonymously (e.g., the comment may be displayed with an anonymous indication adjacent to the comment, such as an anonymous indication 579). Alternatively and/or additionally, the comment may be displayed with a username associated with the first email account (e.g., the username may correspond to the first email address and/or may be different than the first email address). In some examples, whether the comment is displayed anonymously or with the username may be based upon one or more privacy settings (e.g., one or more user-input privacy settings received via the first email interface and/or the first social interaction interface 556) associated with the first email account.

In some examples, the comment section 584 may comprise one or more comment feedback signal selectable inputs associated with the one or more comments. For example, the one or more comment feedback signal selectable inputs may comprise a first comment feedback selectable input 576 associated with the first comment 588. In an example, in response to a selection of the first comment feedback signal selectable input 576, a comment feedback signal (e.g., a positive comment feedback signal) associated with the first comment 588 may be received from the first client device 500. In some examples, in response to receiving the comment feedback signal from the first client device 500, the first social interaction dataset may be updated based upon the comment feedback signal. For example, an indication of the comment feedback signal may be stored in the first social interaction dataset. Alternatively and/or additionally, a first comment feedback signal metric, associated with the first comment 588, stored in the first social interaction dataset may be incremented based upon the comment feedback signal. For example, the first comment feedback signal metric may be based upon (e.g., equal to) a quantity of comment feedback signals associated with the first comment 588 (e.g., a quantity of comment feedback signals received in response to selections of comment feedback signal selectable inputs associated with the first comment 588). In an example, one or more indications of one or more comment feedback signal metrics associated with the one or more comments may be displayed. For example, the one or more indications of the one or more comment feedback signal metrics may comprise an indication 580 of the first comment feedback signal metric.

In some examples, the comment section 584 may comprise one or more comment reply selectable inputs associated with the one or more comments. For example, the one or more comment reply selectable inputs may comprise a first comment reply selectable input 578 associated with the first comment 588. In an example, in response to a selection of the first comment reply selectable input 578, a comment reply text field may be displayed, wherein text may be input via the comment reply text field and/or the text may be submitted as a reply to the first comment 588 in response to a selection of a submit selectable input. In some examples, the reply to the first comment 588 may be received from the first client device 500. In some examples, in response to receiving the reply to the first comment 588 from the first client device 500, the first social interaction dataset may be updated based upon the reply to the first comment 588 (e.g., an indication of the reply to the first comment 588 may be stored in the first social interaction dataset and/or the first comment metric stored in the first social interaction dataset may be incremented based upon the reply to the first comment 588). In an example, the first social interaction dataset may be updated based upon the comment based upon a determination that the reply to the first comment 588 is associated with (e.g., indicative of) the first ID associated with the first social interaction dataset. In some examples, the reply to the first comment 588 may be displayed via the comment section 584 and/or displayed via social interaction interfaces displayed in association with emails of the first set of related emails 504. In some examples, the reply to the first comment 588 may be displayed anonymously. Alternatively and/or additionally, the reply to the first comment 588 may be displayed with the username associated with the first email account.

Figure 5H:
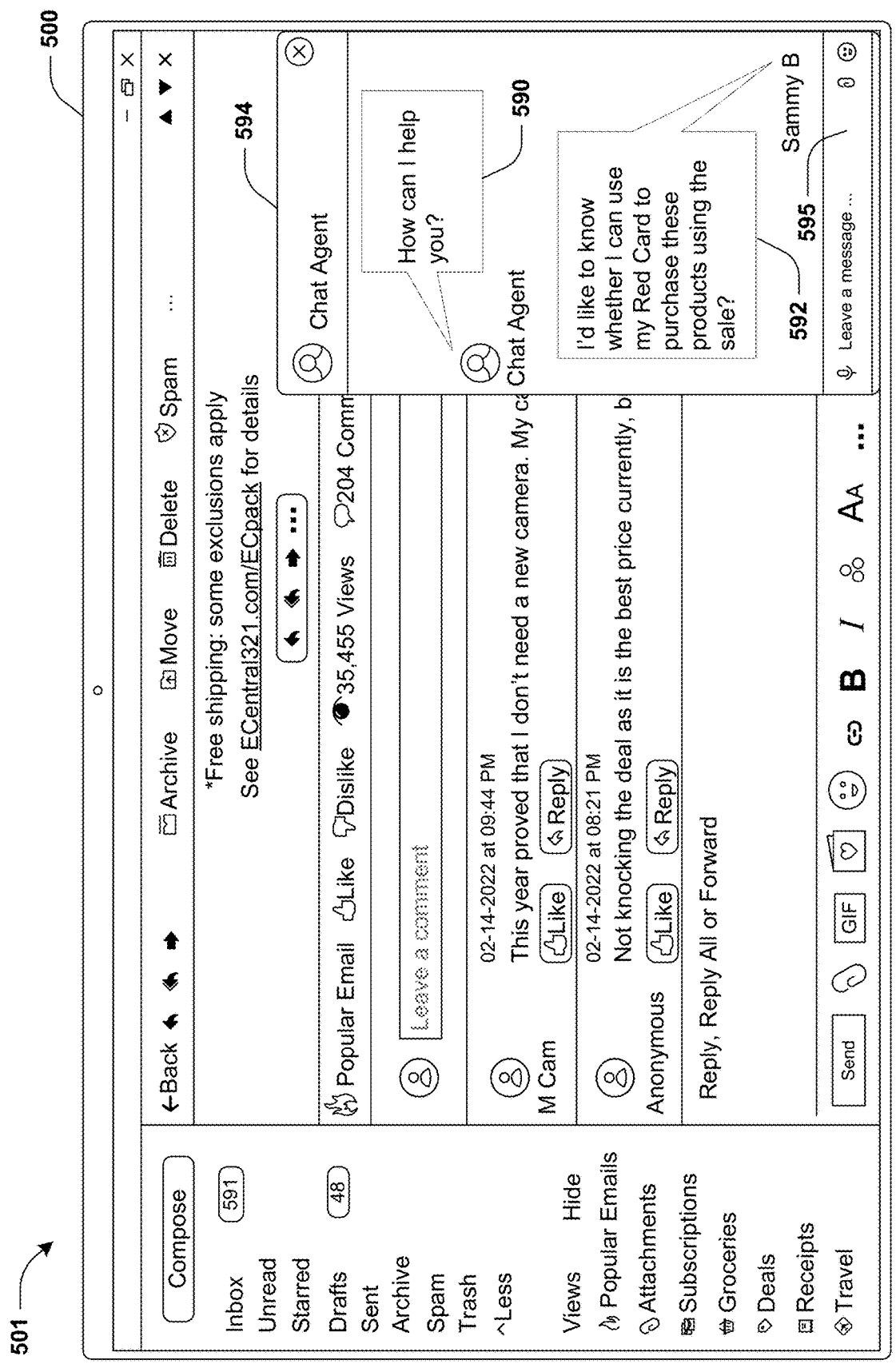
FIG. 5H is a component block diagram illustrating an example system for presenting social interaction interfaces associated with emails, where a first chat interface of a first social interaction interface is displayed.

In some examples, the first social interaction interface 556 may display a first chat graphical object 568 of the first chat feature. The first chat graphical object 568 may be a selectable input. In some examples, in response to a selection of the first chat graphical object 568, a chat interface (e.g., a live chat interface) of the first chat feature may be displayed. FIG. 5H illustrates the first chat interface (shown with reference number 594) being displayed (in response to a selection of the first chat graphical object 568, for example). In some examples, the first chat interface 594 may be used to conduct a conversation (e.g., a chat conversation) between a user of the first client device 500 and a chat entity associated with the first email sender 502, such as at least one of a chat agent, a chatbot, etc. Messages received from the first client device 500 and/or a chat entity device associated with the chat entity may be displayed via the first chat interface 594. In an example in which the chat entity is a chat agent, the chat entity device may display messages of the conversation via a chat interface on the chat entity device. In an example in which the chat entity is a chatbot, the chat entity device may perform operations of the chatbot. In some examples, a first message 590 may be received from the chat entity device. In response to receiving the first message 590, the first message 590 may be transmitted to the first client device 500 and/or displayed via the first chat interface 594. In some examples, the first chat interface 594 may comprise a chat text field 595. In some examples, text may be input via the chat text field 595 (e.g., the text may be typed into the text field 586 and/or may be input via speech recognition) and/or the text may be submitted as a chat message in response to a selection of a submit selectable input. In some examples, a second message 592 (e.g., the text input via the chat text field 595) may be received from the first client device 500. In response to receiving the second message 592, the second message 592 may be transmitted to the chat entity device and/or displayed via a chat interface on the chat entity device. Alternatively and/or additionally, the second message 592 may be displayed via the first chat interface 594. In some examples, the first message 590 and/or the second message 592 may be displayed in real time (e.g., the first message 590 may be displayed via the first chat interface 594 in real time in response to receiving the first message 590 and/or the second message 592 may be displayed via the first chat interface 594 in real time in response to receiving the second message 592).

Alternatively and/or additionally, the first social interaction interface 556 may display a second chat interface of the first chat feature. In an example, the second chat interface may be displayed in response to a selection of a second chat graphical object (not shown). In some examples, the second chat interface may be used to conduct a conversation (e.g., a chat conversation) between users of client devices that are displaying social interaction interfaces associated with emails of the first set of related emails 528. For example, messages received from the client devices may be displayed via the second chat interface (e.g., the messages may be displayed in real time).

In some examples, the first social interaction interface 556 may be displayed and/or interacted with using the first email interface. For example, the first email interface (and/or at least one of a browser, an application, etc. that display the first email interface on the first client device 500) may support displaying the first social interaction interface 556. In an example, the first email interface (and/or at least one of the browser, the application, etc. that display the first email interface on the first client device 500) comprises software that enables displaying the first social interaction interface 556 and/or receiving signals (e.g., at least one of feedback signals, comments, etc.) in response to selections of selectable inputs of the first social interaction interface 556. Alternatively and/or additionally, an email service provider associated with the first email account (e.g., the email service provider of the communication system 506) may provide support for displaying the first social interaction interface 556 via the first email interface. Alternatively and/or additionally, email interfaces (and/or applications) associated with the email service provider may provide support for displaying social interaction interfaces in association with social interaction-activated emails.

In some examples, there may be email interfaces, applications and/or email service providers that do not provide support for displaying a social interaction interface in association with an email of the first set of related emails 528. In some examples, based upon a determination that an email of the first set of related emails 528 is addressed to an email address associated with an email interface, an application and/or an email service provider that do not provide support for displaying a social interaction interface, a dynamic email comprising a social interaction interface may be generated based upon the email (e.g., the dynamic email may comprise email content of the email and/or dynamic content comprising the social interaction interface), and the dynamic email may be transmitted to an email account associated with the email address. The dynamic email may be generated using one or more of the techniques provided herein with respect to example method 600. Accordingly, even though the email interface, the application and/or the email service provider may not provide support for displaying a social interaction interface, the social interaction interface may be displayed (as part of the dynamic email, for example). Information (e.g., one or more metrics of the first set of social interaction metrics and/or one or more comments) from the first social interaction dataset may be displayed via the social interaction interface. Alternatively and/or additionally, in response to receiving one or more signals (e.g., one or more feedback signals, one or more comments, etc.) via the social interaction interface of the dynamic email, the first social interaction dataset may be updated based upon the one or more signals.

In some examples, information of the first social interaction dataset may be provided to a third client device. The third client device may comprise at least one of a laptop, a desktop computer, a phone, a computer, a wearable device, a smart device, a television, any other type of computing device, hardware, etc. In some examples, the information may be indicative of at least one of comments in the first social interaction dataset associated with the first set of related emails 528, one or more metrics of the first set of social interaction metrics, etc. In an example, the third client device may be logged into a first business account associated with the first email sender 502. In some examples, the information may be displayed via a business account interface on the third client device. The third client device and/or the first business account may be associated with the first email sender 502. For example, the third client device and/or the first business account may be authorized to access information associated with emails sent by the first email sender 502. In some examples, the first business account may be authorized to access information associated with emails sent by the first email sender 502 based upon an email verification process. The email verification process may comprise sending a confirmation email to the first sender email address of the first email sender 502 and/or receiving, via a selection of a link in the confirmation email, an indication that the first business account is authorized to access information associated with emails sent by the first email sender 502.

Figure 5I:
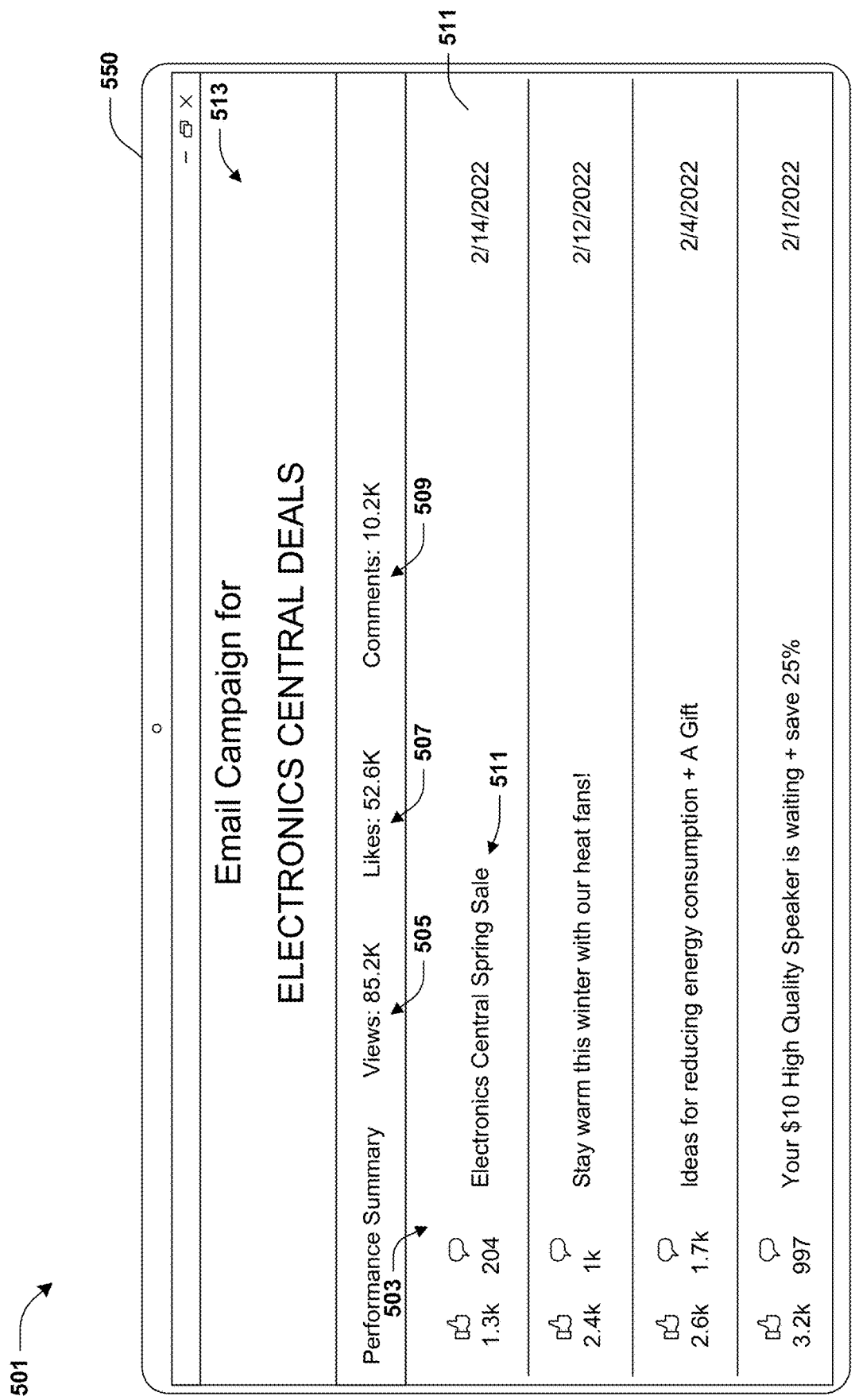
FIG. 5I is a component block diagram illustrating an example system for presenting social interaction interfaces associated with emails, where a business account interface is displayed via a third client device.

FIG. 5I illustrates the business account interface (shown with reference number 513) being displayed via the third client device (shown with reference number 550). In some examples, the business account interface 513 displays a performance summary. The performance summary may indicate one or more metrics associated with emails sent by the first email sender 502. In an example, the performance summary may comprise an indication 505 of a quantity of presentation events of emails sent by the first email sender 502. Alternatively and/or additionally, the performance summary may comprise an indication 507 of a quantity of positive feedback signals received (via social interaction interfaces, for example) for emails sent by the first email sender 502. Alternatively and/or additionally, the performance summary may comprise an indication 509 of a quantity of comments received (via social interaction interfaces, for example) for emails sent by the first email sender 502.

In an example, the business account interface 513 may display a list of items 503. In some examples, each item of the list of items 503 corresponds to a set of related emails sent by the first email sender 502 (e.g., each item of the list of items corresponds to a set of related emails for which a social interaction dataset is stored on the social interaction database 538). In an example, a first item 511 of the list of items 503 corresponds to the first set of related emails 528.

In some examples, indications of social interaction metrics associated with items of the list of items 503 may be displayed. In an example, the first item 511 may comprise an indication of the first positive feedback signal metric associated with the first set of related emails 528 (e.g., the indication of the first positive feedback signal metric indicates that about 1,300 likes associated with the first set of related emails 528 have been received). Alternatively and/or additionally, the first item 511 may comprise an indication of the first comment metric associated with the first set of related emails 528 (e.g., the indication of the first comment metric indicates that 204 comments associated with the first set of related emails 528 have been received and/or are available to view).

In an example, in response to a selection of an item of the list of items 503, information associated with the item may be displayed via the business account interface 513.

Figure 5J:
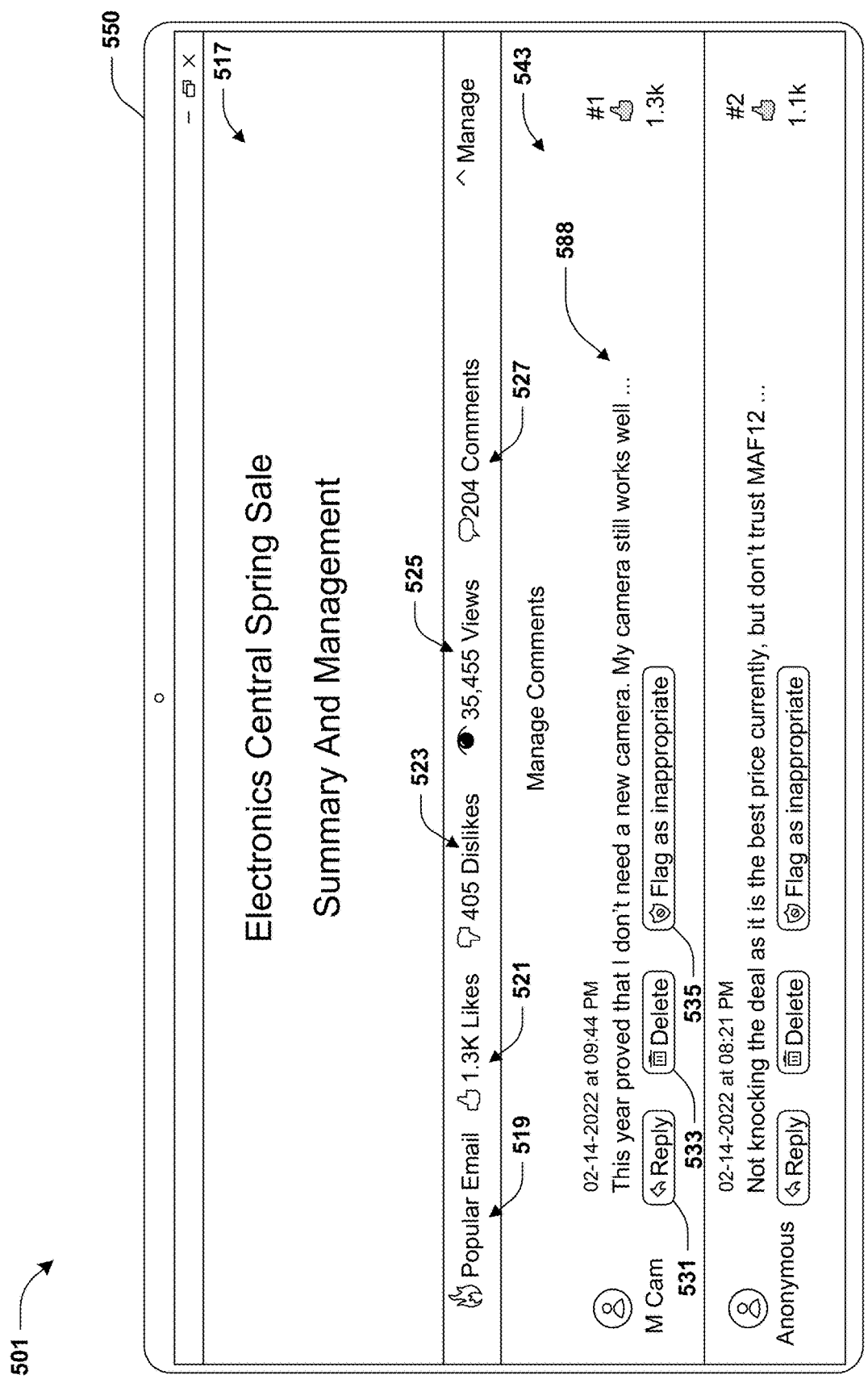
FIG. 5J is a component block diagram illustrating an example system for presenting social interaction interfaces associated with emails, where an email information interface is displayed via a third client device.

FIG. 5J illustrates an email information interface 517 being displayed via the third client device 550. For example, the email information interface 517 may be displayed via the business account interface 513 in response to a selection of the first item 511. The email information interface 517 may display information associated with the first set of related emails 528. In an example, the email information interface 517 may display a popular email graphical object 519 indicative of the first set of emails 528 being popular emails. For example, the popular email graphical object 519 may be displayed based upon a determination that at least one of the first comment metric exceeds a threshold comment metric, the first positive feedback signal metric exceeds a threshold positive feedback signal metric, the first presentation metric exceeds a threshold presentation metric, etc. Alternatively and/or additionally, the email information interface 517 may display indications of metrics of the first set of social interaction metrics, such as at least one of an indication 521 of the first positive feedback signal metric, an indication 523 of the first negative feedback signal metric, an indication 525 of the first presentation metric, an indication 527 of the first comment metric, etc.

In some examples, the email information interface 517 may display a second comment section 543. The second comment section 543 may display one or more comments in the first social interaction dataset associated with the first set of related emails 528 (e.g., the one or more comments may be retrieved from the first social interaction dataset associated with the first set of related emails 528). In an example, the one or more comments may comprise the first comment 588.

The second comment section 543 may comprise one or more comment reply selectable inputs associated with the one or more comments. For example, the one or more comment reply selectable inputs may comprise a first comment reply selectable input 531 associated with the first comment 588. In response to a selection of the first comment reply selectable input 531 a comment reply text field may be displayed, wherein text may be input via the comment reply text field and/or the text may be submitted as a reply to the first comment 588 in response to a selection of a submit selectable input. In some examples, a reply from the third client device 550 may be posted with a business username and/or a business icon associated with the first business account (e.g., the business username may be displayed adjacent to the reply). In some examples, the business username and/or the business icon may be indicative of an entity (e.g., at least one of a company, a shopping website, a store, a brand, an organization, etc.) associated with the first email sender 502 such that a user viewing the reply may distinguish replies by the first business account from other replies and/or other comments.

The second comment section 543 may comprise one or more comment delete selectable inputs associated with the one or more comments. For example, the one or more comment delete selectable inputs may comprise a first comment delete selectable input 533 associated with the first comment 588. In an example, in response to a selection of the first comment delete selectable input 533, the first comment 588 may be deleted from the first social interaction dataset associated with the first set of related emails 528 and/or the first comment 588 may cease being presented via comment sections associated with the first set of related emails 528.

The second comment section 543 may comprise one or more comment flag selectable inputs associated with the one or more comments. For example, the one or more comment flag selectable inputs may comprise a first comment flag selectable input 535 associated with the first comment 588.

In an example, in response to a selection of the first flag selectable input 535, the first comment 588 may be flagged as inappropriate. In some examples, in response to flagging the first comment 588, the first comment 588 may be transmitted to a comment review device (e.g., for review by a review agent). In some examples, the first comment 588 may be deleted from the first social interaction dataset associated with the first set of related emails 528 (and/or the first comment 588 may cease being presented via comment sections associated with the first set of related emails 528) in response to receiving (from the comment review device, for example) an indication that the first comment 588 is inappropriate and/or should be removed.

Figure 5K:
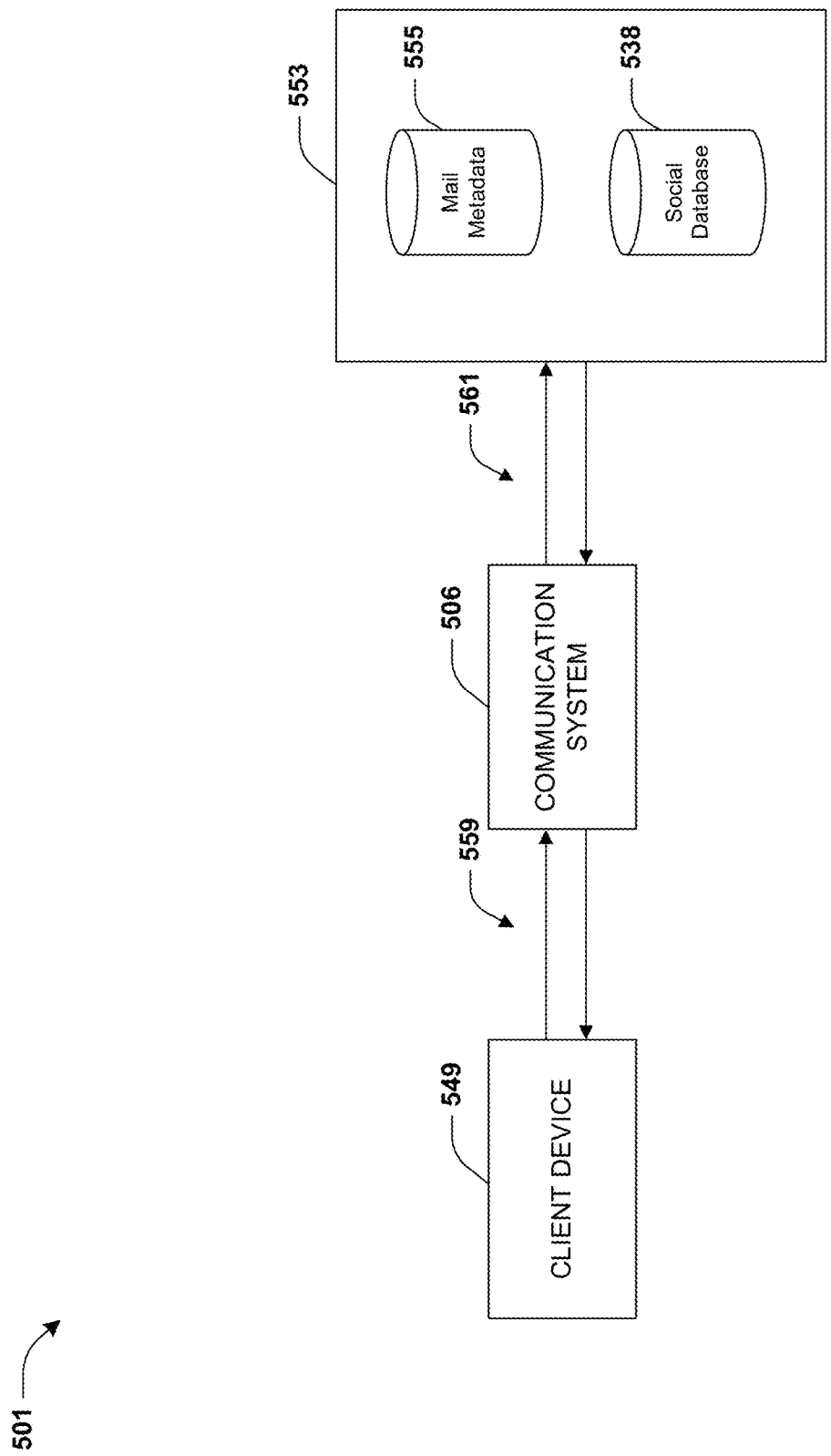
FIG. 5K is a component block diagram illustrating an example system for presenting social interaction interfaces associated with emails, where a client device, a communication system and/or one or more servers communicate.

FIG. 5K illustrates communication of a client device 549, the communication system 506 and/or one or more servers 553. The client device 549 may comprise at least one of a laptop, a desktop computer, a phone, a computer, a wearable device, a smart device, a television, any other type of computing device, hardware, etc. In some examples, the client device 549 may be logged into an email account associated with the communication system 506. In some examples, first communication 559 between the client device 549 and the communication system 506 may be performed. In some examples, the first communication 559 may be performed when at least one of a browser (e.g., a web browser), an application (e.g., at least one of a mobile application, a web application, an email application, etc.), etc. of the client device 549 is logged into the email account and/or authorized to access information associated with the email account. In some examples, the first communication 559 may be performed using at least one of the browser, the application, etc. of the client device 549. In some examples, second communication 561 between the one or more servers 553 and the communication system 506 may be performed.

In an example, the client device 549 may transmit a request to access an email to the communication system 506. In response to receiving the request, the communication system 506 may transmit a request to the one or more servers for the email and/or social interaction information associated with a set of related emails comprising the email. In some examples, metadata associated with the email may be retrieved from the email metadata database (shown with reference number 555). The email metadata database may be stored on the one or more servers 553. Alternatively and/or additionally, the social interaction information may be retrieved from the social interaction database 538. In some examples, a social interaction dataset stored in the social interaction database 538 may be identified based upon a determination that the email is part of a set of related emails associated with the social interaction dataset. The social interaction dataset may be identified based upon the metadata, associated with the email, retrieved from the mail metadata database 555 (e.g., the social interaction dataset may be identified based upon a determination that the metadata is indicative of an ID that matches an ID associated with the social interaction dataset). Alternatively and/or additionally, the social interaction dataset may be identified based upon an indication (e.g., an indication of an ID associated with the social interaction dataset) in the request from the client device 549. In some examples, the communication system 506 may receive the email and/or the social interaction information from the one or more servers 553. In response to receiving the email and/or the social interaction information, the communication system 506 may transmit the email and/or the social interaction information to the client device and/or may display, via the client device 549, the email and/or a social interaction interface comprising the social interaction information.

In some examples, a first entity associated with the communication system 506 may receive compensation from a second entity associated with the first email sender 502 and/or the first business account. For example, the communication system 506 may transmit a bill, to a device associated with the second entity, indicative of one or more services for which compensation is due. In some examples, services provided by the communication system 506 may comprise at least one of presenting social interaction interfaces associated with emails sent by the first email sender 502, providing the first business account with access to the business account interface, providing the first business account with access to social interaction metrics associated with emails sent by the first email sender 502, etc. In some examples, one or more first services (e.g., free services) of the services may be provided free of charge and/or the second entity may be charged for one or more second services (e.g., premium services) of the services. In an example, the bill may be indicative of an amount of compensation of one or more services for which compensation is due. Alternatively and/or additionally, the bill may comprise a link to a payment page with which a payment of the amount of compensation may be made. Alternatively and/or additionally, the payment may be performed (e.g., automatically) based upon stored bank account information associated with the second entity.

Figure 6:
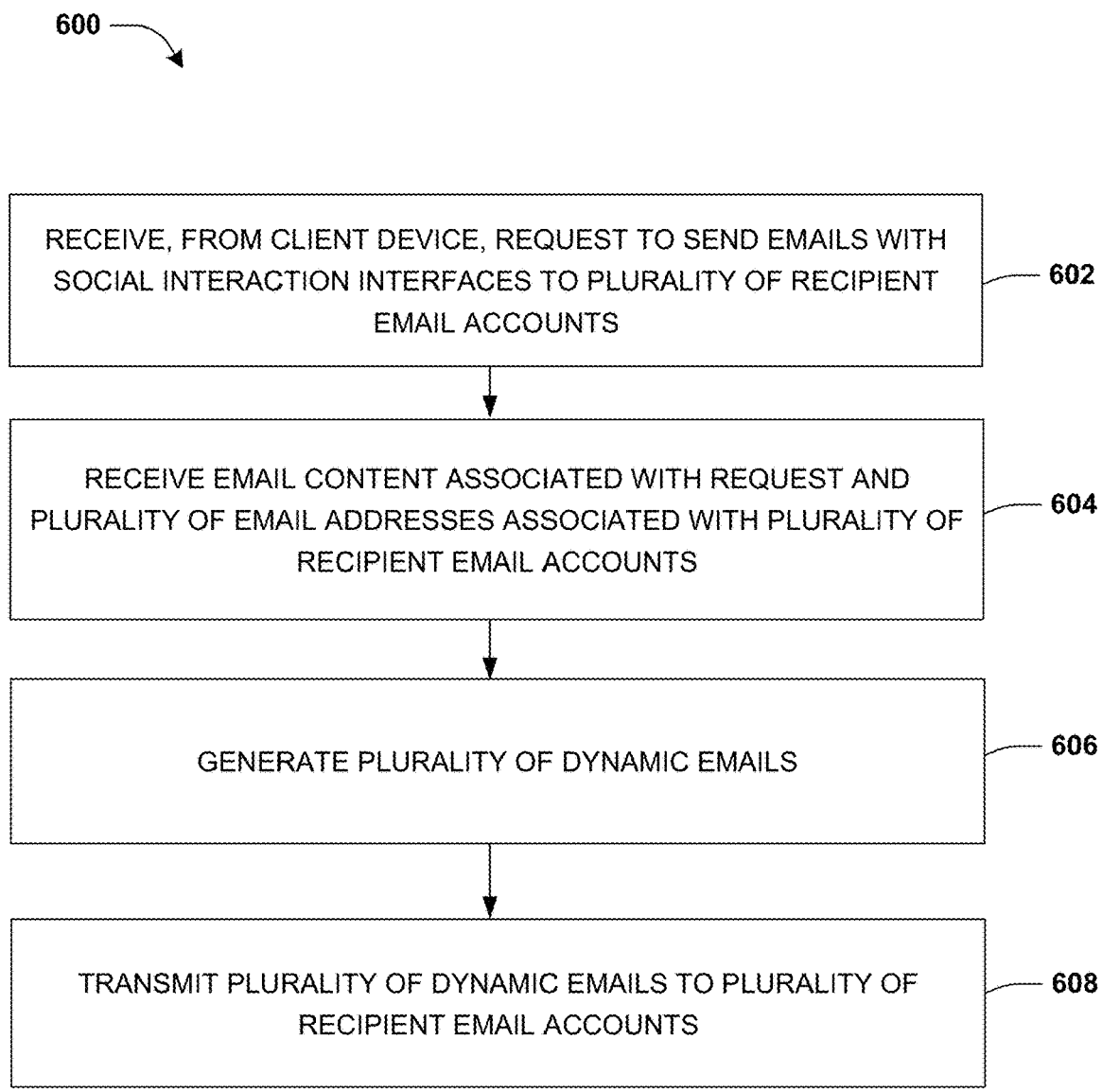
FIG. 6 is a flow chart illustrating an example method for generating and/or providing emails with social interaction interfaces.
Figure 7A:
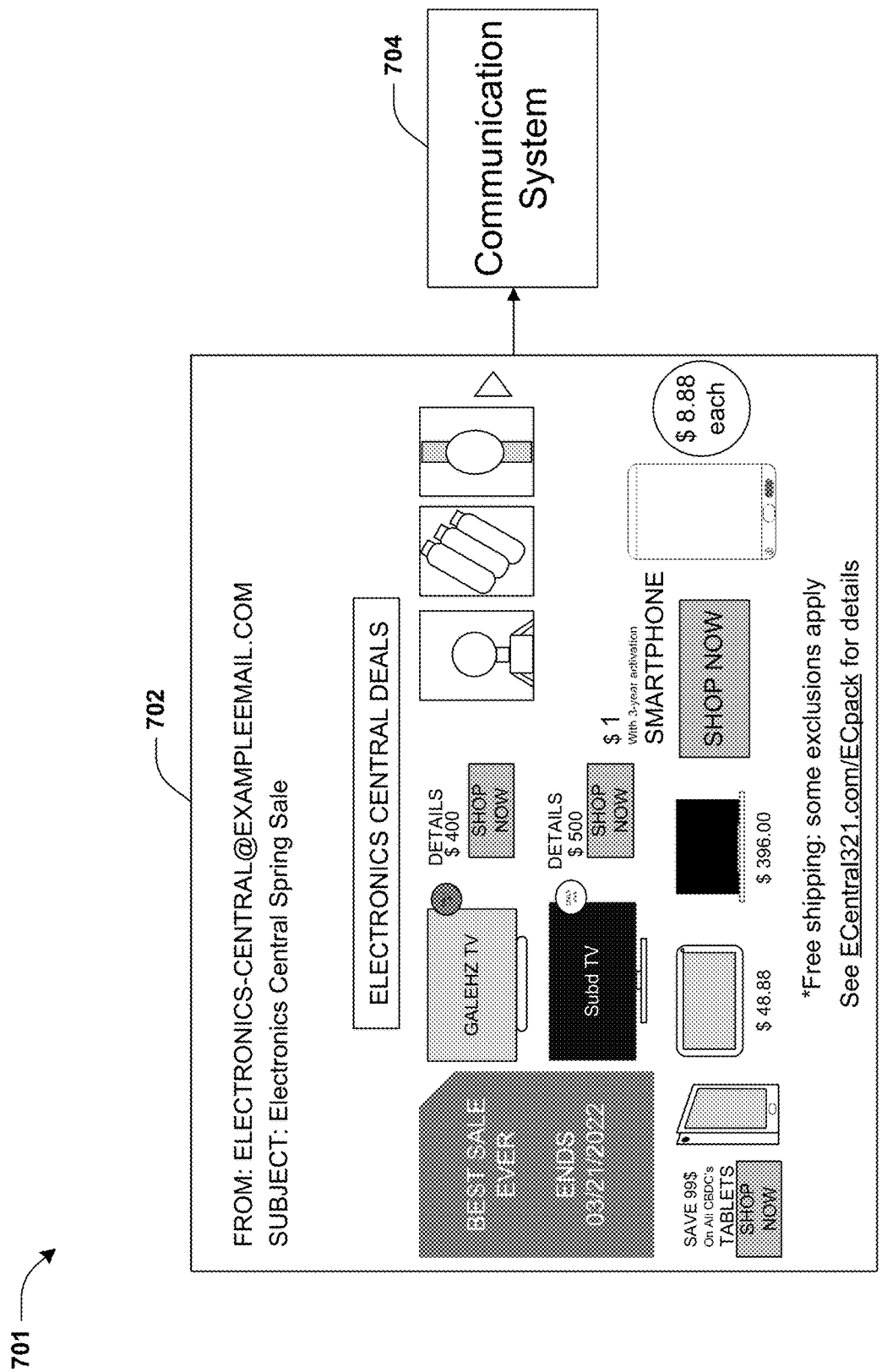
FIG. 7A is a component block diagram illustrating an example system for generating and/or providing emails with social interaction interfaces, where email content is received by a communication system.
Figure 7B:
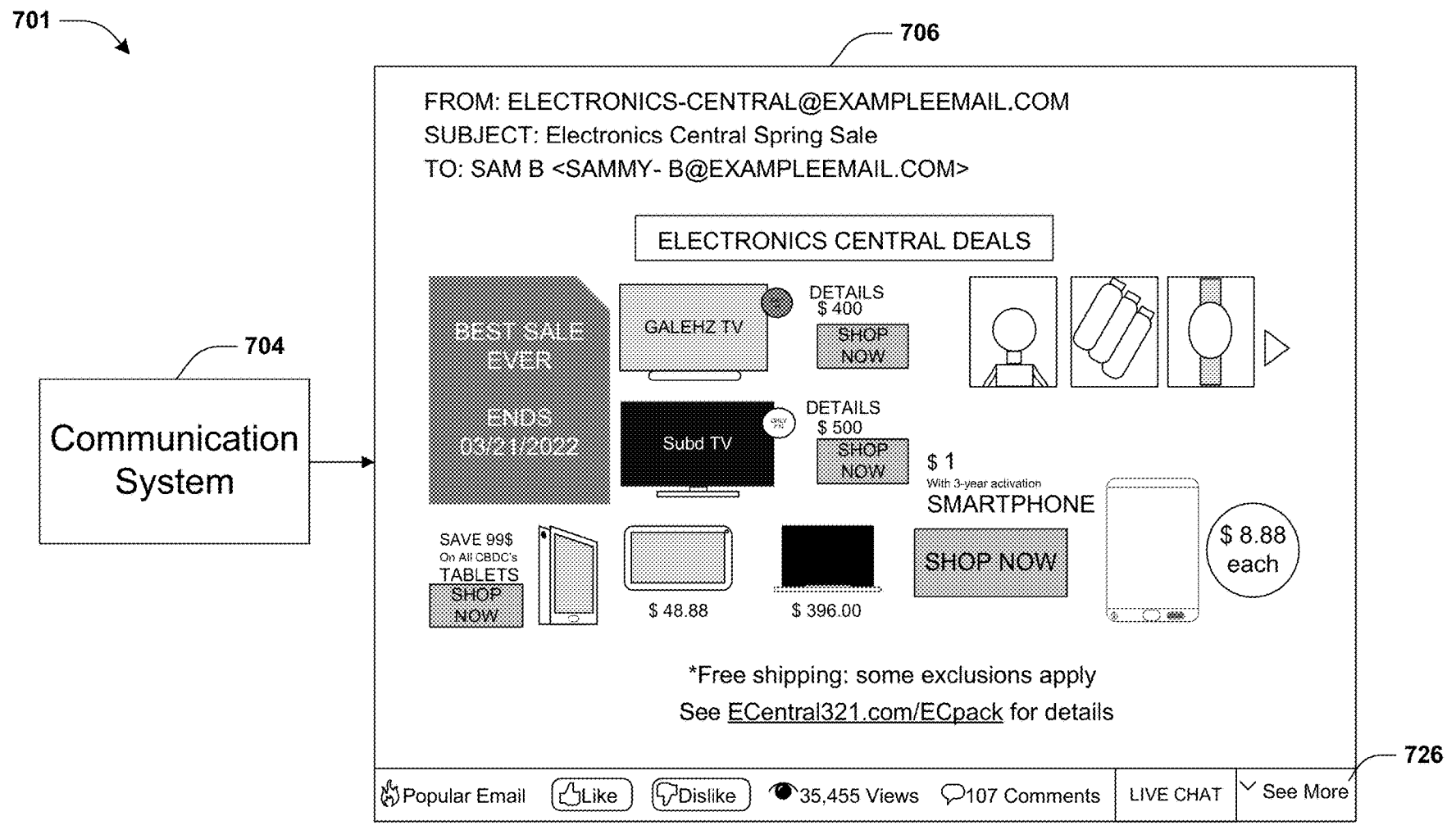

An embodiment of generating and/or providing emails with social interaction interfaces associated with emails is illustrated by an example method 600 of FIG. 6, and is further described in conjunction with system 701 of FIGS. 7A-7B.

At 602, a request to send one or more emails with one or more social interaction interfaces to a plurality of recipient email accounts may be received from a first client device. The first client device may comprise at least one of a laptop, a desktop computer, a phone, a computer, a wearable device, a smart device, a television, any other type of computing device, hardware, etc.

At 604, email content associated with the request and/or a plurality of email addresses associated with the plurality of recipient email accounts may be received. FIG. 7A illustrates an example of the email content (shown with reference number 702) being received by a communication system 704 (e.g., an email service provider). In some examples, the email content may comprise at least one of an indication of a sender email address (e.g., "ELECTRONICSCENTRAL@EXAMPLEEMAIL.COM" shown in FIG. 7A), an indication of a subject (e.g., "Electronics Central Spring Sale" shown in FIG. 7A), etc. Alternatively and/or additionally, the email content 702 may comprise an email body comprising content (e.g., text, one or more images, one or more links, etc.).

At 606, a plurality of dynamic emails may be generated. The plurality of dynamic emails may be generated based upon the plurality of email addresses (e.g., email headers of the plurality of dynamic emails may be indicative of email addresses associated of the plurality of email addresses) and/or the email content 702. In an example, the plurality of dynamic emails may be generated to comprise at least a portion of the email content 702. Alternatively and/or additionally, the plurality of dynamic emails may be generated to comprise dynamic content comprising social interaction interfaces.

In an example, the plurality of dynamic emails comprises a first dynamic email addressed to a first email address of the plurality of email addresses. FIG. 7B illustrates the communication system 704 generating the first dynamic email (shown with reference number 706). The first dynamic email 706 may comprise at least a portion of the email content 702 (such as some of the email content 702 or all of the email content 702). Alternatively and/or additionally, the first dynamic email 706 may comprise dynamic content comprising a social interaction interface 726 comprising one or more social interaction features. The one or more social interaction features may comprise at least one of a commenting feature, a feedback feature, a chat feature, etc. In some examples, the dynamic content (e.g., the social interaction interface 726) may be implemented using Accelerated Mobile Pages (AMP) technology and/or other technology. In some examples, the social interaction interface 726 may comprise one, some and/or all of the functionalities and/or components provided herein with respect to the first social interaction interface 556 and/or the example method 400 of FIG. 4.

At 608, the plurality of dynamic emails may be transmitted to the plurality of recipient email accounts (e.g., each dynamic email of the plurality of dynamic emails may be addressed to an email address of the plurality of email addresses). In an example, the first dynamic email 706 of the plurality of dynamic emails may be transmitted to a first email account associated with the first email address of the plurality of email addresses, the second dynamic email of the plurality of dynamic emails may be transmitted to a second email account associated with a second email address of the plurality of email addresses, etc.

In some examples, the social interaction interface 726 may display social interaction information associated with the plurality of dynamic emails. For example, the social interaction information may comprise one or more social interaction metrics associated with the plurality of dynamic emails. The one or more social interaction metrics may comprise at least one of a comment metric (e.g., a quantity of comments received via social interaction interfaces of the plurality of dynamic emails), a positive feedback signal metric (e.g., a quantity of positive feedback signals received via social interaction interfaces of the plurality of dynamic emails), a negative feedback signal metric (e.g., a quantity of negative feedback signals received via social interaction interfaces of the plurality of dynamic emails), a presentation metric (e.g., a quantity of presentation events of emails of the plurality of dynamic emails), etc. Alternatively and/or additionally, the one or more social interaction metrics may be based upon at least one of comments, feedback signals, presentation event signals, etc. received via social interaction interfaces of the plurality of dynamic emails. For example, the comments and/or the feedback signals may be received from one or more client devices associated with one or more email addresses to which one or more emails of the plurality of dynamic emails are addressed. Alternatively and/or additionally, the social interaction information may comprise comments associated with the plurality of dynamic emails. In some examples, the social interaction information associated with the plurality of dynamic emails may be stored (in a social interaction database, for example) and/or retrieved (for presentation via dynamic emails of the plurality of dynamic emails) using one or more of the techniques provided herein with respect to the example method 400 of FIG. 4.

For example, a social interaction dataset associated with the plurality of dynamic emails may be generated (e.g., the social interaction dataset may be stored in the social interaction database). The social interaction dataset may be updated based upon signals (e.g., one or more comments and/or one or more feedback signals) received via social interaction interfaces of the plurality of dynamic emails. For example, the signals may comprise a comment associated with a dynamic email of the plurality of dynamic emails and/or a feedback signal (e.g., a positive feedback signal and/or a negative feedback signal) associated with the dynamic email of the plurality of dynamic emails. In an example, the comment and/or the feedback signal may be received from a client device associated with an email address to which the dynamic email is addressed (e.g., the comment and/or the feedback signal may be received from the client device when the dynamic email comprising a social interaction interface is presented and/or interacted with via the client device).

In an example, a client device may display the first dynamic email 706 comprising the social interaction interface 726. In some examples, one or more indications of the one or more social interaction metrics associated with the plurality of dynamic emails may be transmitted to the client device and/or the one or more indications may be displayed via the social interaction interface 726 (e.g., the one or more indications may comprise at least one of an indication of the comment metric, an indication of the positive feedback signal metric, an indication of the negative feedback signal metric, an indication of the presentation metric, etc.). The one or more social interaction metrics indicated by the one or more indications may be determined based upon the social interaction dataset associated with the plurality of dynamic emails. In some examples, one or more social interaction signals may be received, from the client device, via the social interaction interface 726. For example, the one or more social interaction signals may comprise at least one of a comment, a feedback signal (e.g., a positive feedback signal and/or a negative feedback signal), etc. In some examples, the social interaction dataset associated with the plurality of dynamic emails may be updated based upon the one or more social interaction signals. In an example in which the one or more social interaction signals comprise the comment, the social interaction dataset may be updated by adding the comment to the social interaction dataset and/or by incrementing the comment metric indicated by the social interaction dataset. In an example in which the one or more social interaction signals comprise the positive feedback signal metric, the social interaction dataset may be updated by incrementing the positive feedback signal metric indicated by the social interaction dataset.

It may be appreciated that the disclosed subject matter may assist a user (and/or a device associated with the user) in engaging with emails, such as at least one of posting comments associated with emails (e.g., the comments may comprise reviews, questions, etc.), posting replies to comments associated with emails, viewing comments and/or comment replies associated with emails, chatting with a chat agent associated with an email sender of an email, communicating with other users via comments and/or chat interfaces, viewing social interaction metrics associated with emails, etc.

Implementation of at least some of the disclosed subject matter may lead to benefits including, but not limited to, a reduction in screen space and/or an improved usability of a display (e.g., of the device) (e.g., as a result of automatically enabling the user to post comments and/or comment replies and/or view comments and/or comment replies without the user needing to manually open a social media platform to post comments and/or view comments associated with an email).

Alternatively and/or additionally, implementation of at least some of the disclosed subject matter may lead to benefits including, but not limited to, a reduction in screen space and/or an improved usability of a display (e.g., of the device) (e.g., as a result of automatically enabling the user to have a chat conversation with a chat agent associated with an email sender of an email without needing to open a different application and/or web page to access a chat platform for communicating with the chat agent).

Alternatively and/or additionally, implementation of at least some of the disclosed subject matter may lead to benefits including, but not limited to, a reduction in screen space and/or an improved usability of a display (e.g., of the device) (e.g., as a result of automatically displaying social interaction metrics associated with emails in a list of email items such that the user may determine, using the social interaction metrics, which email is popular and/or interesting to the user, thereby preventing the user from opening an email that the user is not interested in).

Alternatively and/or additionally, implementation of at least some of the disclosed subject matter may lead to benefits including, but not limited to, increased feedback provided to an entity associated with an email sender (e.g., as a result of determining social interaction metrics associated with emails sent by the email sender and/or providing indications of the social interaction metrics to the entity).

In some examples, at least some of the disclosed subject matter may be implemented on a client device, and in some examples, at least some of the disclosed subject matter may be implemented on a server (e.g., hosting a service accessible via a network, such as the Internet).

Figure 8:
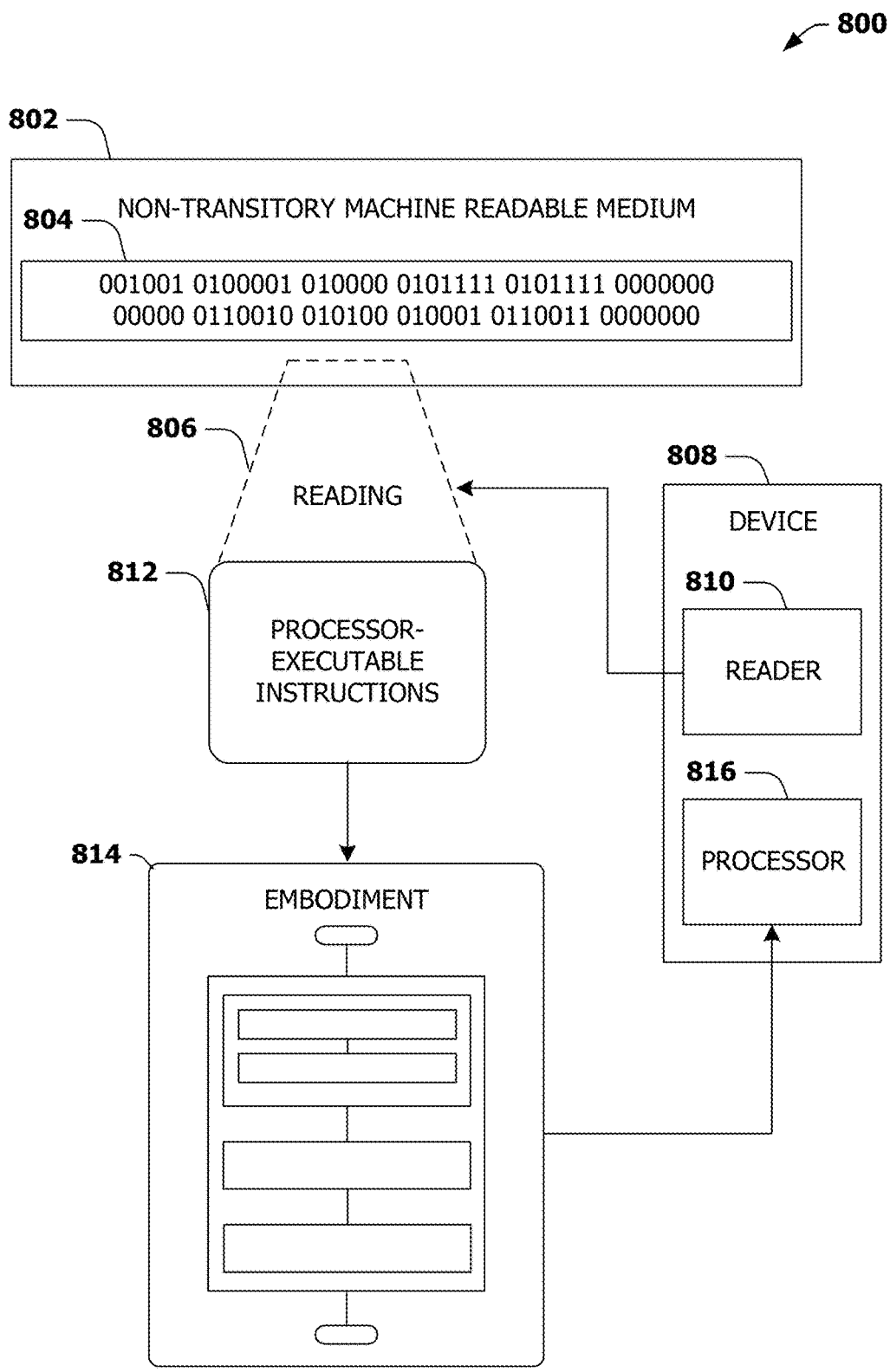
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4 and/or at least some of the example method 400 of FIG. 6, for example. In some embodiments, the processor-executable instructions 812 are configured to cause implementation of a system, such as at least some of the exemplary system 501 of FIGS. 5A-5K and/or at least some of the exemplary system 701 of FIGS. 7A-7B, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
    receiving, by a communication system, an email from an email sender and addressed to an email address associated with an email account;
    receiving, by the communication system and from a client device associated with the email account, a request to display the email;
    determining, by the communication system, that the email addressed to the email address is associated with a set of related emails from the email sender;
    determining, by the communication system, that a second email from the email sender and addressed to a second email address, but not addressed to the email address, is associated with the set of related emails from the email sender; and
    in response to receiving the request to display the email, providing for display, by the communication system and via an email interface on the client device, the email and a social interaction interface comprising one or more social interaction features facilitating interaction between a first user of the email address to which the email from the email sender was addressed and a second user of the second email address to which the second email from the email sender was addressed, wherein the one or more social interaction features comprise at least one of a commenting feature, a feedback feature, or a chat feature.

2. The method of claim 1, comprising:
    generating a social interaction dataset associated with the set of related emails;
    receiving, from a second client device associated with a second email account, one or more social interaction signals associated with the second email of the set of related emails, wherein the one or more social interaction signals comprise at least one of a comment associated with the second email or a feedback signal associated with the second email; and
    updating the social interaction dataset, associated with the set of related emails, based upon the one or more social interaction signals.

3. The method of claim 2, wherein:
    providing for display the social interaction interface comprises providing for display at least one of:
        a comment section, of the commenting feature, displaying one or more comments in the social interaction dataset associated with the set of related emails, wherein the one or more comments comprise the comment associated with the second email; or
        a feedback indication, of the feedback feature, indicative of a feedback signal metric indicated by the social interaction dataset associated with the set of related emails, wherein the feedback signal metric is based upon one or more feedback signals associated with one or more emails of the set of related emails, wherein the one or more feedback signals comprise the feedback signal associated with the second email.

4. The method of claim 2, wherein:
the providing for display the social interaction interface is based upon a determination that the email is a social interaction-activated email; and
the determination that the email is the social interaction-activated email is based upon:
identifying the set of related emails comprising the email; and
a determination that a quantity of emails of the set of related emails exceeds a threshold quantity of emails.

5. The method of claim 2, comprising:
identifying the set of related emails, comprising analyzing data of a plurality of emails, comprising the set of related emails, to cluster the plurality of emails into one or more groups of emails, wherein the set of related emails corresponds to a group of emails of the one or more groups of emails.

6. The method of claim 2, comprising:
receiving, from a device associated with the email sender of the email, a social interaction activation message indicative of the set of related emails, wherein identifying the set of related emails is based upon the social interaction activation message.

7. The method of claim 6, wherein:
the providing for display the social interaction interface is based upon a determination that the email is a social interaction-activated email; and
the determination that the email is the social interaction-activated email is based upon a determination that the set of related emails, indicated by the social interaction activation message, comprises the email.

8. The method of claim 2, comprising:
determining, based upon the social interaction dataset, one or more first social interaction metrics associated with the set of related emails, wherein the one or more first social interaction metrics comprise at least one of:
a comment metric based upon one or more comments associated with one or more first emails of the set of related emails, wherein the one or more comments are received from one or more client devices associated with one or more first email addresses to which the one or more first emails are addressed;
a feedback signal metric based upon one or more feedback signals associated with one or more second emails of the set of related emails, wherein the one or more feedback signals are received from one or more client devices associated with one or more second email addresses to which the one or more second emails are addressed; or
a presentation metric based upon one or more presentation events in which one or more third emails of the set of related emails are presented.

9. The method of claim 8, comprising:
transmitting one or more indications of the one or more first social interaction metrics to a device associated with the email sender of the set of related emails.

10. The method of claim 8, wherein:
providing for display the social interaction interface comprises providing for display one or more indications of the one or more first social interaction metrics.

11. The method of claim 1, wherein the social interaction interface comprising the one or more social interaction features facilitates the first user interacting with the second user without the first user transmitting an email to the second user and without the first user receiving an email from the second user.

12. The method of claim 8, comprising:
providing for display a list of email items via the client device associated with the email account, wherein the list of email items comprises an email item associated with the email, wherein the request to display the email is received in response to a selection of the email item associated with the email.

13. The method of claim 12, wherein:
an order in which email items are displayed in the list of email items is based upon the one or more first social interaction metrics associated with the email and second social interaction metrics associated with second emails associated with second email items of the list of email items.

14. The method of claim 1, comprising:
receiving, via the social interaction interface, a selection of a selectable input of the chat feature; and
in response to receiving the selection of the selectable input, providing for display a chat interface via the client device.

15. The method of claim 1, comprising:
receiving, from the client device, one or more social interaction signals associated with the email;
updating a social interaction dataset, associated with the set of related emails, based upon the one or more social interaction signals;
providing for display, by the communication system and via a second email interface on a second client device, the second email and a second social interaction interface comprising the one or more social interaction features associated with the set of related emails from the email sender;
receiving, from the second client device, one or more second social interaction signals associated with the second email; and
based upon the second email being associated with the same set of related emails from the same email sender as the email, updating the same social interaction dataset, associated with the set of related emails, based upon the one or more second social interaction signals.

16. A computing device comprising:
a processor; and
memory comprising processor-executable instructions that when executed by the processor cause performance of operations, the operations comprising:
receiving, by a communication system and from a client device, a request to send emails with social interaction interfaces to a plurality of recipient email accounts;
receiving, by the communication system, email content associated with the request and a plurality of email addresses associated with the plurality of recipient email accounts;
generating, by the communication system, a plurality of dynamic emails comprising a first dynamic email addressed to a first email address of the plurality of email addresses and a second dynamic email addressed to a second email address of the plurality of email addresses, wherein the first dynamic email comprises:
at least a portion of the email content; and
dynamic content comprising a social interaction interface comprising one or more social interaction features facilitating interaction between a first user of the first email address to which the first dynamic email from an email sender is addressed and a second user of the second email address to which the second dynamic email from the email sender is addressed, wherein the one or more social interaction features comprise at least one of a commenting feature, a feedback feature, or a chat feature; and transmitting, by the communication system, the plurality of dynamic emails to the plurality of recipient email accounts.

17. The computing device of claim 16, the operations comprising:

generating a social interaction dataset associated with the plurality of dynamic emails;

receiving, from a second client device associated with a second email account of the plurality of recipient email accounts, one or more social interaction signals associated with a second dynamic email of the plurality of dynamic emails, wherein the one or more social interaction signals comprise at least one of a comment associated with the second dynamic email or a feedback signal associated with the second dynamic email; and updating the social interaction dataset, associated with the plurality of dynamic emails, based upon the one or more social interaction signals.

18. The computing device of claim 17, wherein:

the social interaction interface comprises at least one of:

a comment section, of the commenting feature, displaying one or more comments in the social interaction dataset associated with the plurality of dynamic emails, wherein the one or more comments comprise the comment associated with the second dynamic email; or a feedback indication, of the feedback feature, indicative of a feedback signal metric indicated by the social interaction dataset associated with the plurality of dynamic emails, wherein the feedback signal metric is based upon one or more feedback signals associated with one or more emails of the plurality of dynamic emails, wherein the one or more feedback signals comprise the feedback signal associated with the second dynamic email.

19. The computing device of claim 17, the operations comprising:

determining, based upon the social interaction dataset, one or more first social interaction metrics associated with the plurality of dynamic emails, wherein the one or more first social interaction metrics comprise at least one of:

a comment metric based upon one or more comments associated with one or more first emails of the plurality of dynamic emails, wherein the one or more comments are received from one or more client devices associated with one or more first email addresses to which the one or more first emails are addressed;

a feedback signal metric based upon one or more feedback signals associated with one or more second emails of the plurality of dynamic emails, wherein the one or more feedback signals are received from one or more client devices associated with one or more second email addresses to which the one or more second emails are addressed; or a presentation metric based upon one or more presentation events in which one or more third emails of the plurality of dynamic emails are presented; and transmitting one or more indications of the one or more first social interaction metrics to a device.

20. A non-transitory machine readable medium having stored thereon processor-executable instructions that when executed cause performance of operations, the operations comprising:

receiving, by a communication system, an email from an email sender and addressed to an email address associated with an email account;

determining, by the communication system, that the email addressed to the email address is a social interaction-activated email;

receiving, by the communication system and from a client device associated with the email account, a request to display the email;

determining, by the communication system, that a second email from the email sender and addressed to a second email address, but not addressed to the email address, is associated with a set of related emails from the email sender, wherein the set of related emails is associated with the email; and based upon the determination by the communication system that the email is the social interaction-activated email, providing for display, by the communication system and via an email interface on the client device, the email and a social interaction interface comprising one or more social interaction features facilitating interaction between a first user of the email address to which the email from the email sender was addressed and a second user of the second email address to which the second email from the email sender was addressed, wherein the one or more social interaction features comprise at least one of a commenting feature, a feedback feature, or a chat feature.

* * * * *